US007801795B2

United States Patent
Nunes et al.

(10) Patent No.: US 7,801,795 B2
(45) Date of Patent: Sep. 21, 2010

(54) ELECTRONIC COMMUNICATION NETWORK RANKING FOR AUTOMATED MARKET SYSTEM

(75) Inventors: Adam Nunes, New York, NY (US); Daniel F. Moore, New Haven, CT (US); Mark Denat, Bedford, NY (US); John Malitzis, Washington, DC (US); Karen Peterson, Stamford, CT (US); Anna Ewing, Long Island, NY (US); Steven J. Randich, Westport, CT (US); Richard G. Ketchum, Alexandria, VA (US); Dean Furbush, Mamaroneck, NY (US); Christopher Folkemer, Columbia, MD (US)

(73) Assignee: The Nasdaq OMX Group, Inc., Rockville, MD (US)

( * ) Notice: Subject to any disclaimer, the term of this patent is extended or adjusted under 35 U.S.C. 154(b) by 1604 days.

(21) Appl. No.: 10/274,287

(22) Filed: Oct. 18, 2002

(65) Prior Publication Data
US 2003/0126066 A1   Jul. 3, 2003

Related U.S. Application Data

(63) Continuation-in-part of application No. 09/401,872, filed on Sep. 23, 1999, now Pat. No. 7,181,424.

(51) Int. Cl.
*G06Q 40/00* (2006.01)
(52) U.S. Cl. .......................................... 705/37; 705/35
(58) Field of Classification Search ............. 705/35–41, 705/37
See application file for complete search history.

(56) References Cited

U.S. PATENT DOCUMENTS

| 5,689,652 | A  | * | 11/1997 | Lupien et al. ................. 705/37 |
| 7,181,424 | B1 | * | 2/2007  | Ketchum et al. .............. 705/37 |
| 2002/0161687 | A1 | * | 10/2002 | Serkin et al. .................. 705/37 |
| 2003/0130926 | A1 | * | 7/2003  | Moore et al. .................. 705/37 |
| 2003/0172024 | A1 | * | 9/2003  | Kokis et al. ................... 705/37 |
| 2003/0225673 | A1 | * | 12/2003 | Hughes et al. ................ 705/37 |
| 2003/0229557 | A1 | * | 12/2003 | Richmann et al. ............ 705/36 |

(Continued)

OTHER PUBLICATIONS

NASD Rulemaking: Relating to an Intergrated Order Delivery and Execution System, Securities and Exchange Commission (Release No. 34-39718) Mar. 4, 1998.*

(Continued)

*Primary Examiner*—Jagdish N Patel
*Assistant Examiner*—Kevin Poe
(74) *Attorney, Agent, or Firm*—Fish & Richardson P.C.

(57) ABSTRACT

A method for trading a security in an electronic market includes entering an order at a client station for executing against any market participant that can at least in part satisfy the order, and matching the entered order at a server system against interest in the market based on how the market participant participates in the market with a portion of the interest in the market being prioritized according to price priority among displayed quotes/orders of market makers, ECNs that do not charge a separate quote-access fee, and non-attributable agency orders of UTP Exchanges, and subsequently by displayed quotes/orders of ECNs that charge a separate quote-access fee, with the quotes/orders of the ECNs that charge a separate quote-access fee being ranked by the amount of the quote-access fee charged.

42 Claims, 20 Drawing Sheets

U.S. PATENT DOCUMENTS

2004/0019553 A1* 1/2004 Setz et al. .................. 705/37
2006/0161498 A1* 7/2006 Morano et al. ............. 705/37
2006/0195387 A1* 8/2006 Kemp et al. ............... 705/37

OTHER PUBLICATIONS

SR-NASD-99-53—Amendment No. 1, NASD, Oct. 26, 1999, 26 pages.
SR-NASD-99-53—Amendment No. 2, NASD, Oct. 29, 1999, 1 page.
SR-NASD-99-53—Amendment No. 3 and Response to Comments, NASD, Mar. 22, 2000, 39 pages.
SR-NASD-99-53—Amendment No. 4, NASD, Mar. 23, 2000, 53 pages.
SR-NASD-99-53—Amendment No. 5 and Second Response to Comments, NASD, May 16, 2000, 35 pages.
SR-NASD-99-53—Amendment No. 6, NASD, Jul. 6, 2000, 29 pages.
SR-NASD-99-53—Securities and Exchange Commission, Proposed Rule Change, Amendment No. 8, NASD, Oct. 20, 2000, 123 pages.
SR-NASD-99-53—Amendment No. 9, NASD, Jan. 8, 2001, 3 pages.

* cited by examiner

ELECTRONIC COMMUNICATION NETWORK RANKING FOR AUTOMATED MARKET SYSTEM

RELATED APPLICATIONS

This application is a continuation-in-part application of U.S. patent application Ser. No. 09/401,872, Filed on Sep. 23, 1999 now U.S. Pat. No. 7,181,424, and entitled "MONTAGE FOR AUTOMATED MARKET SYSTEM", assigned to the assignee of the present invention and incorporated herein by reference.

BACKGROUND

This invention relates to trading systems particularly financial trading systems.

Electronic equity markets, such as The Nasdaq Stock Market® collect, aggregate and display pre-trade information to market participants. In an electronic market, pre-trade information takes the form of a quote that represents a single or an aggregate of same-priced principal or agency orders. A market such as Nasdaq also provides trading platforms through which market participants may access liquidity indicated in the marketplace. One of the concerns of regulators relates to best execution. Other entities may display quotes or place orders for display. For example, electronic communication networks, (ECNs) are one type. Some ECNs charge quote access fees while others do not. Other entities include UTP Exchanges. UTP Exchanges are exchanges that have unlisted trading privileges.

SUMMARY

According to an aspect of the present invention, a method for trading a security in an electronic market includes, entering an order at a client station for executing against any market participant that can at least in part satisfy the order; and matching the entered order at a server system against interest in the market based on how the market participant participates in the market with a portion of the interest in the market being prioritized according to price priority among displayed quotes/orders of market makers, ECNs that do not charge a separate quote-access fee, and non-attributable agency orders of UTP Exchanges, and subsequently by displayed quotes/orders of ECNs that charge a separate quote-access fee, with the quotes/orders of the ECNs that charge a separate quote-access fee being ranked by the amount of the quote-access fee charged.

According to an additional aspect of the present invention, a method for trading a security in an electronic market includes entering an order at a client station for executing against any market participant that can at least in part satisfy the order; and matching the entered order at a server system against interest in the market based on how the market participant participates in the market with a portion of the interest in the market being prioritized according to price priority among displayed quotes/orders of market makers, ECNs, and non-attributable agency orders of UTP Exchanges, with each ECN order and quote-access fee charged by the respective ECN aggregated to produce the respective price used for determining price priority.

According to an additional aspect of the present invention, a computer program product residing on a computer readable medium, for trading a security in an electronic market, includes instructions to cause a computer to enter an order at a client station for executing against any market participant that can at least in part satisfy the order; and to match the entered order at a server system against interest in the market based on how the market participant participates in the market with a portion of the interest in the market being prioritized according to price priority among displayed quotes/orders of market makers, ECNs that do not charge a separate quote-access fee, and non-attributable agency orders of UTP Exchanges, and subsequently by displayed quotes/orders of ECNs that charge a separate quote-access fee, with the quotes/orders of the ECNs that charge a separate quote-access fee being ranked by the amount of the quote-access fee charged.

According to an additional aspect of the present invention, a computer program product residing on a computer readable medium, for trading a security in an electronic market, includes instructions to cause a computer to enter an order at a client station for executing against any market participant that can at least in part satisfy the order; and to match the entered order at a server system against interest in the market based on how the market participant participates in the market with a portion of the interest in the market being prioritized according to price priority among displayed quotes/orders of market makers, ECNs, and non-attributable agency orders of UTP Exchanges, with each ECN order and quote-access fee charged by the respective ECN aggregated to produce the respective price used for determining price priority.

According to an additional aspect of the present invention, a trading process, for trading a security in an electronic market, includes an order entering process to enter an order at a client station for executing against any market participant that can at least in part satisfy the order and a matching process to match the entered order at a server system against interest in the market based on how the market participant participates in the market with a portion of the interest in the market being prioritized according to price priority among displayed quotes/orders of market makers, ECNs that do not charge a separate quote-access fee, and non-attributable agency orders of UTP Exchanges, and subsequently by displayed quotes/orders of ECNs that charge a separate quote-access fee, with the quotes/orders of the ECNs that charge a separate quote-access fee being ranked by the amount of the quote-access fee charged.

According to an additional aspect of the present invention, a trading process, for trading a security in an electronic market, includes an order entering process to enter an order at a client station for executing against any market participant that can at least in part satisfy the order and a matching process to match the entered order at a server system against interest in the market based on how the market participant participates in the market with a portion of the interest in the market being prioritized according to price priority among displayed quotes/orders of market makers, ECNs, and non-attributable agency orders of UTP Exchanges, with each ECN order and quote-access fee charged by the respective ECN aggregated to produce the respective price used for determining price priority.

One or more of the following features may also be included.

The displayed quotes/orders of the market makers, the ECNs that do not charge a separate quote-access fee, and the non-attributable agency orders of the UTP Exchanges may be time prioritized if there is a tie in price priority. The displayed quotes/orders of the ECNs that charge a separate quote-access fee may be time prioritized if there is a tie in the amount of the quote-access fee charged. One ECN that charges no quote-access fee may be assigned a higher priority than another ECN that charges a quote-access fee. One ECN that charges a quote-access fee may be assigned a higher priority than another ECN that charges a larger quote-access fee. Each ECN that charges a separate quote-access fee may enter, into the server system, a summary order that may include the quote-access fee associated with the ECN. The entered order may be rounded up in price to the nearest cent and displayed to a user. The entered order may be rounded down in price to the nearest cent and displayed to a user. The interest in the market may be subsequently further prioritized according to time priority of the displayed quotes/orders of the market makers, the ECNs, and the non-attributable agency orders of the UTP Exchanges if there is a tie in price priority. One ECN may be assigned a higher priority than another ECN that has a larger aggregate price. Each ECN may enter into the server system a summary order that may include the quote-access fee, if any, associated with the ECN.

One or more advantages can be provided from the above. The invention provides market participants control over the sequence that entered orders are matched against quote-access fee charging ECNs. By prioritizing ECN orders based on the quote-access fee charged, the market participants can prevent their orders from being matched against ECNs that they consider to charge an excessive quote-access fee. Also, by prioritizing the ECN orders according to an aggregate of the order price and the quote-access fee charged by the respective ECN, an ECN that charges a quote-access fee with a particular order does not receive an unfair advantage when compared to another ECN that charges slightly larger quote-access fee but a smaller order price.

DESCRIPTION OF DRAWINGS

FIG. 5 depicts the arrangement of FIGS. 5A-5D.

DETAILED DESCRIPTION

Figure 1:
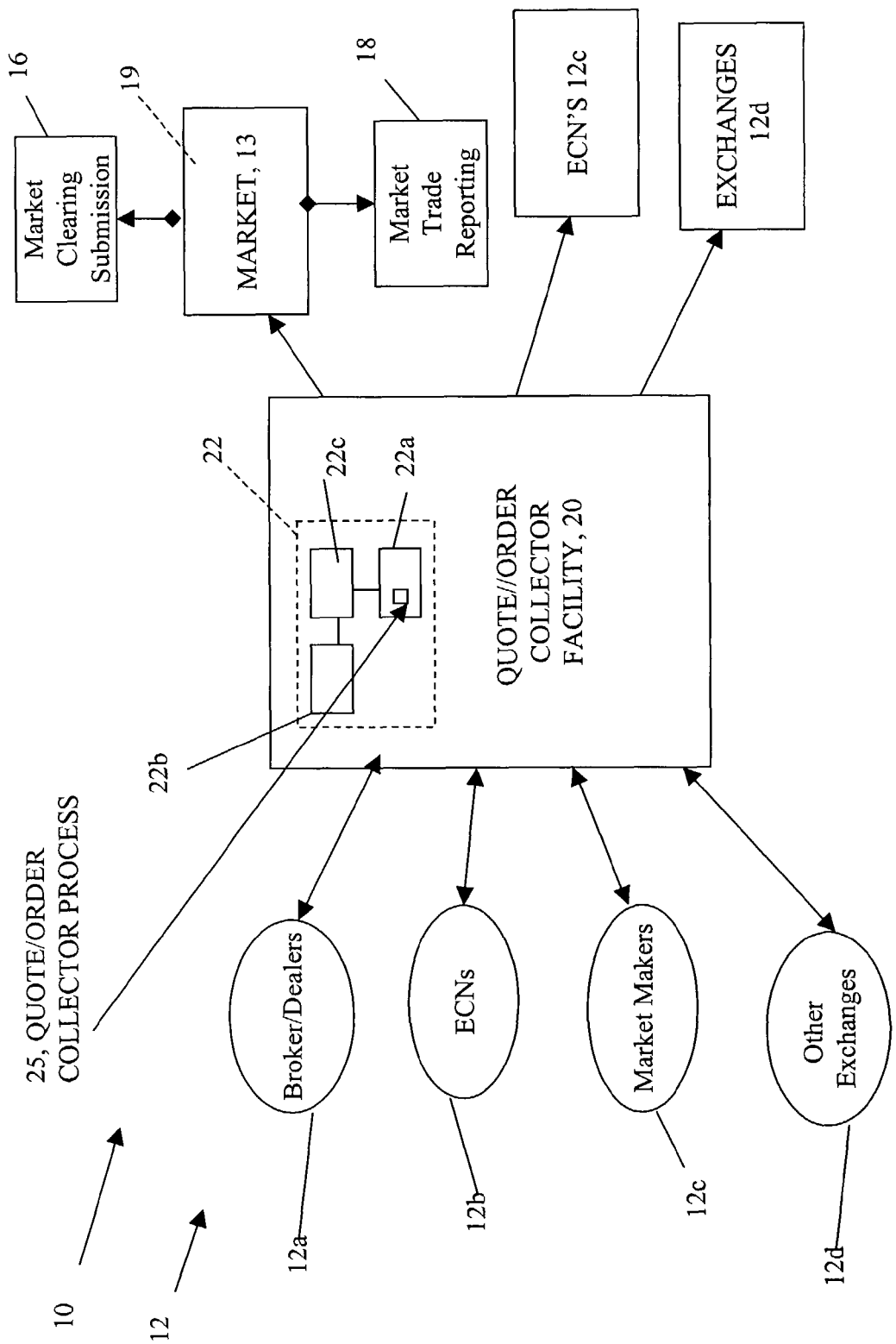
FIG. 1 is a block diagram of a market system.

Referring to FIG. 1, an electronic market 10 is shown. The electronic market 10 includes client systems 12 that access a central quote/order collector system 20. The client systems 12 can be broker/dealer systems 12a, electronic communication networks (ECN's) 12b, market-marker systems 12c, and other exchanges 12d. The connections can use existing Nasdaq protocols such as SelectNet®, Small Order Execution Systems$^{SM}$ (SOES$^{SM}$), and so forth. The client systems 12 include a processor, memory and a storage device, e.g., a client workstation or personal computer (all not shown) that can include a client process to enter quotes/orders into the electronic market system 10. The quote/order collector system 20 causes the order execution or order delivery systems (e.g., SOES$^{SM}$ and SelectNet$^{SM}$) to deliver executions or orders to a market that is coupled to a clearing system 16 and a reporting system 18. It also causes delivery of executions or routing of orders to the ECN's 12b, depending on the status of the ECN, and routing of orders to other markets and exchanges 12d. The quote/order collector system 20 is comprised of one or preferably a plurality of server computers generally denoted as 22 including a processor 22a, main memory 22b and storage 22c. The storage system 22c includes quote/order collector process 25 that is executed in memory 22b. In general, server 22 is a complex computer server, the details of which are not important to an understanding of the present invention.

The quote/order collector process 25 collects pre-trade information in the form of quotes or orders. The distinction between a quote and an order depends on several factors. For example, each market maker can send a proprietary quote, i.e., a quote that represents its own trading interest, or an agency quote that represents trading interest of a sponsored entity. If one proprietary quote is sent it could be considered one order. If one agency quote is sent it also could be considered one order. If an agency quote reflects an aggregation of more than one agency order, however, the aggregate agency order could be considered a quote. Entering quotes are limited to registered market makers 12c and ECNs 12b and possible UTP Exchanges 12d. For any given stock, a registered market maker or ECN may directly enter a non-marketable order, i.e., quote into the system 20 on behalf of its customer account, or it may sponsor the direct entry of an order by its customer. All sponsored, quotes are sent to the quote/order collector system 20 under the name of the sponsoring market maker or ECN. Every registered market maker or ECN can submit an unlimited number of non-marketable quotes to the system 20.

Figure 1A:
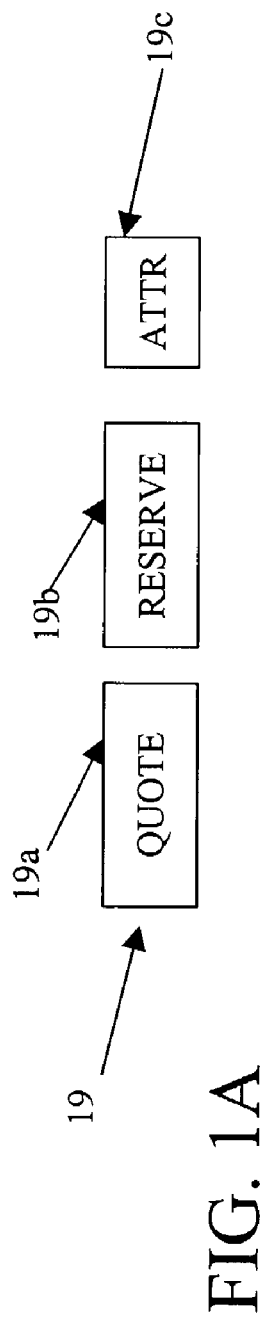
FIG. 1A is a diagram showing a format for quotes.

As shown in FIG. 1A, each quote 19 submitted to the electronic market system 10 can include a displayed quote size 19a, a reserve size 19b and an indication 19c (ATTR) of whether the quote size is attributable or non-attributable. Quote size 19a, when attributable based on indicator 19c, is directly attributable to the market maker or ECN and is displayed in a "current quote" montage on an order display window 250 to be discussed below in FIG. 9. Quote size 19a when non-attributable is the size that the market maker or ECN wishes to display to the marketplace through an aggregate montage of the order display window 250 discussed below in FIG. 9. This quote size 19a is not attributable to the market maker or ECN until it is executed. Reserve size 19b is the size that is not displayed to the marketplace but that is immediately accessible through the quote/order collector system 20. In order to use reserve size 19b, a market maker can be required to have a minimum amount displayed in the aggregate quote size 19a without attributable indicator 19c.

Figure 9:
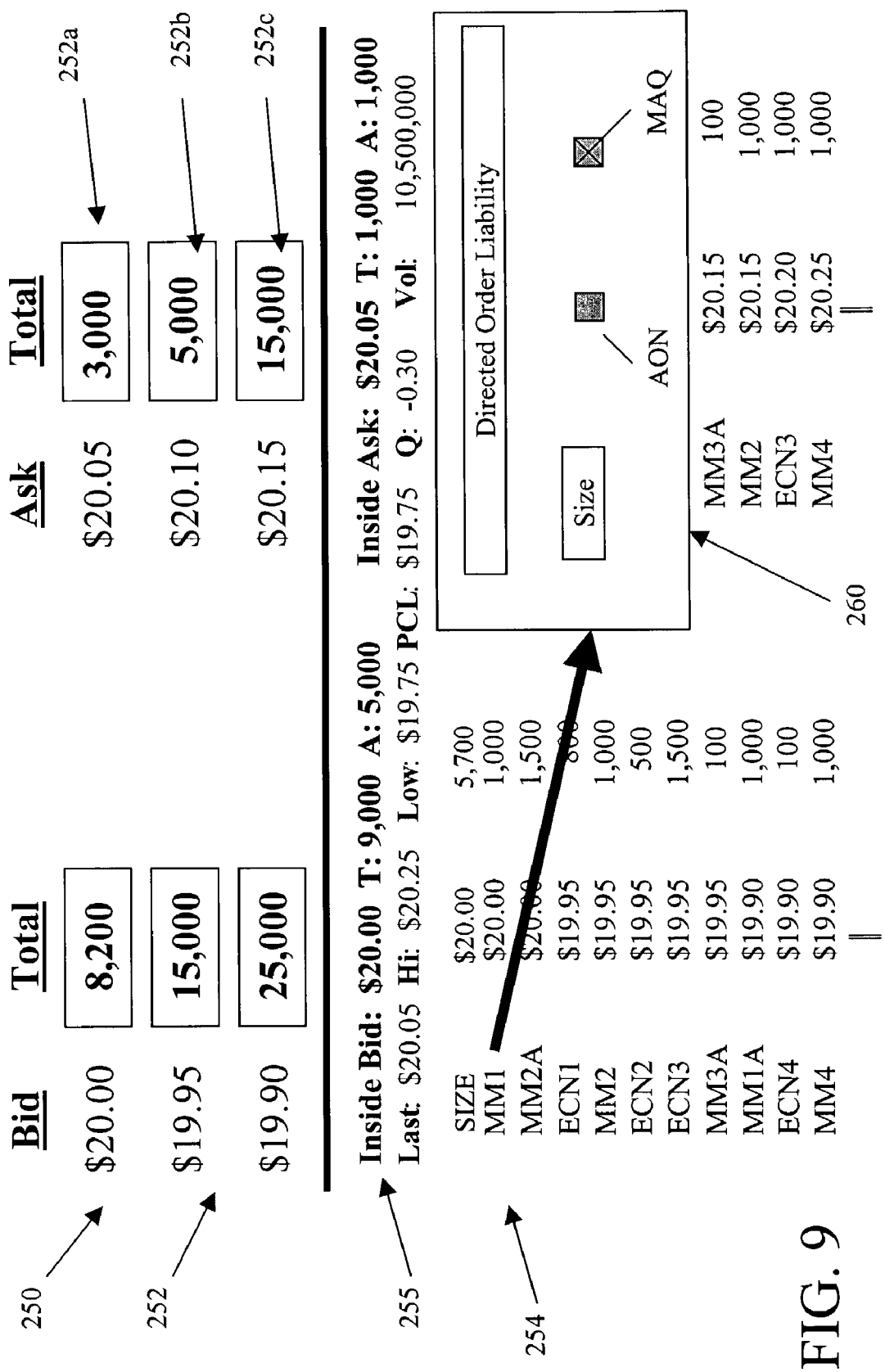
FIG. 9 is a diagram depicting a montage and order entry for directed orders.

The current quote montage 257 of the window 250 without agency quotes is similar to the long existing Nasdaq® display montage, whereas the current quote montage 257 with the agency quotes as depicted in FIG. 9 is similar to that shown in U.S. patent application Ser. No. 09/208,942, filed on Dec. 12, 1998 entitled "DUAL QUOTE MARKET SYSTEM" by Richard G. Ketchum et al. and assigned in part to the assignee of the present invention.

A broker/dealer can receive an order from a customer. The broker/dealer can send that order to the order collector system 20 to be executed with quotes that are posted by electronic communication networks, market makers or other markets. In this arrangement, orders of broker/dealers are not posted as quotes.

Figure 1B:
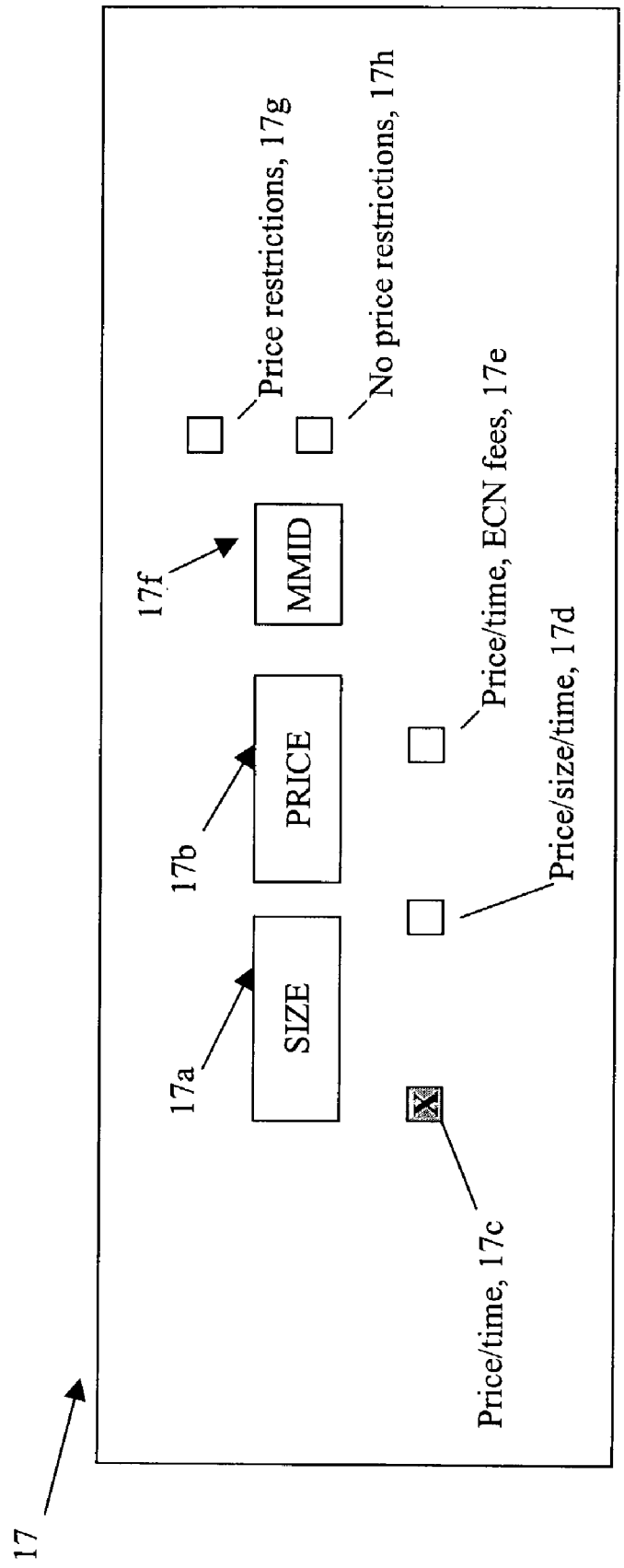
FIG. 1B, a diagram depicting an entry screen for non-directed orders or preferenced orders.

Referring to FIG. 1B, an entry screen 17 for non-directed order entry is shown. The screen 17 allows a participant to enter non-directed orders and would generally include fields 17a-17e for entering information including price, amount, and also three type fields. The type fields 17c-17e determine how the order interacts in the execution/routing manager 26d (shown in FIG. 2B) against Quoting Market Participant's contra-side quotes/orders. The type fields choose a priority, e.g., price/time box 17c; or price/size/time box 17d; or price/time that accounts for ECN access fees box 17e.

The screen 17 can also have a field 17f to enter a quoting market participant's symbol for the purpose of entering preferenced orders. Optionally, the screen 17 can have fields 17g, 17h to indicate a preference order type, e.g., a preferenced order that has price restrictions box 17g or a preferenced order that does not have price restrictions box 17h. Alternatively, the electronic market system 10 can be configured to accept only one type of preferenced order and not the other.

Order Collector Facility

Figure 2A:
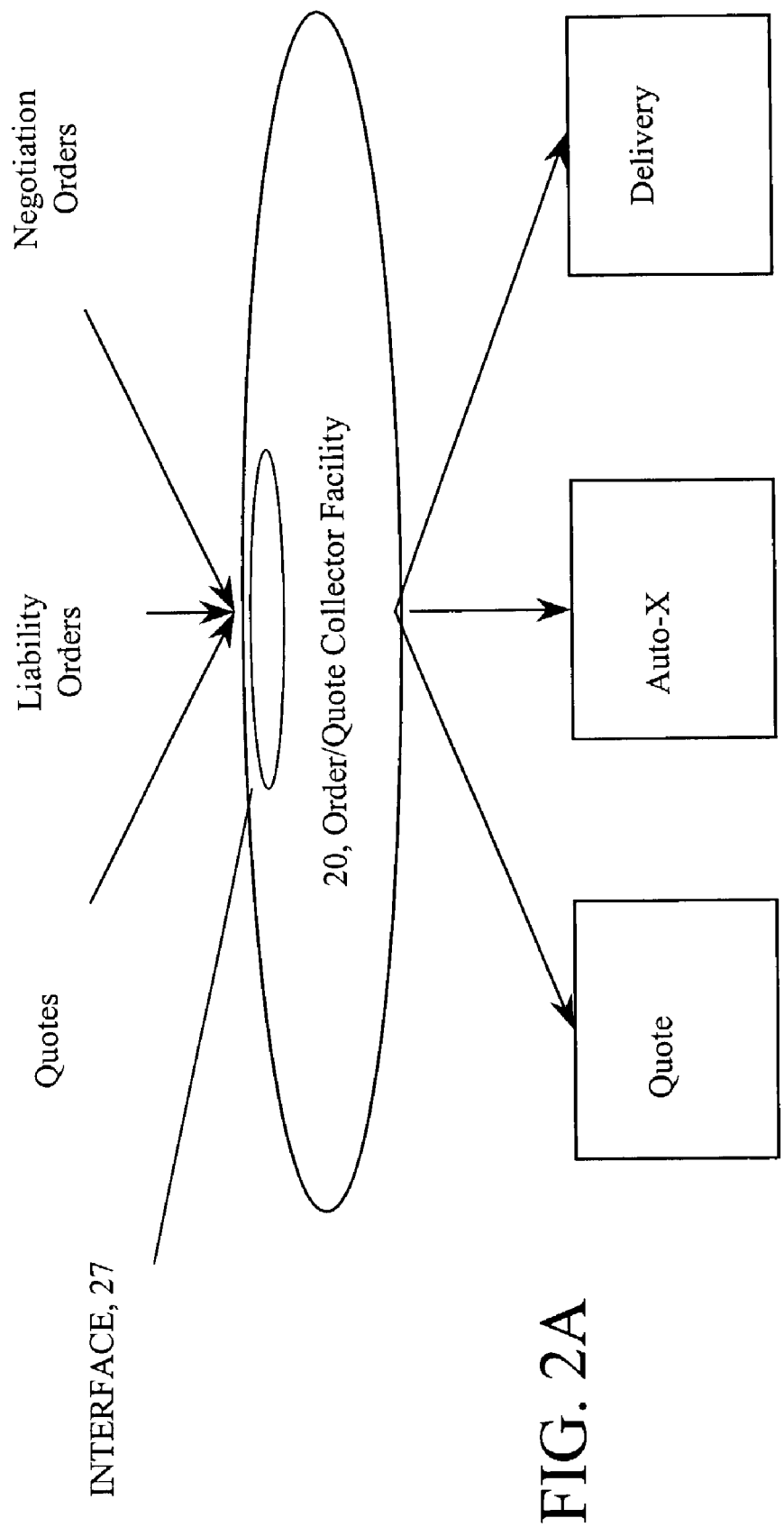
FIG. 2A is a block diagram showing arrangement of a quote/order collector facility.

Referring to FIG. 2A, the quote/order collector system 20 receives quotes, liability orders, (non-liability orders) and directed orders from market participants. The quote/order collector system 20 allows a quote/order to be displayed in the market, and also allows for marketable orders to be executed or routed to market participants.

The order quote collector system 20 also includes an interface 21 that couples the order collector system 20 to a plurality of order delivery systems. For example, the interface 21 can couple the order quote collector system 20 to an order execution system, e.g., the Small Order Execution System® (SOES$^{SM}$) and to an order delivery and negotiation system, e.g., SelectNet®. The interface 21 would provide access to information contained in order flow delivered via the delivery systems to a quote/order collection process 25 described in conjunction with FIG. 2B. In general, the electrical and logical functions which comprise the interface 21 can be similar to the ones currently existing in the SOES$^{SM}$/SelectNet® systems. The interface 21 or the process 25 would extract information from the quotes and make that information available to the quote order collector process 25. The quote/order collector process 25 extracts information and processes orders in a unified manner to allow the order/quote collector system 20 to be a unifying point of collection of all orders that are sent to the market 10.

The interface 21 can also be used to route executions of liability orders back to market participants whose quotes/orders were executed against and can deliver orders, both liability orders for execution or non-liability orders for negotiation against market participants whose quotes are selected for further negotiation via the SelectNet® systems.

Figure 2B:
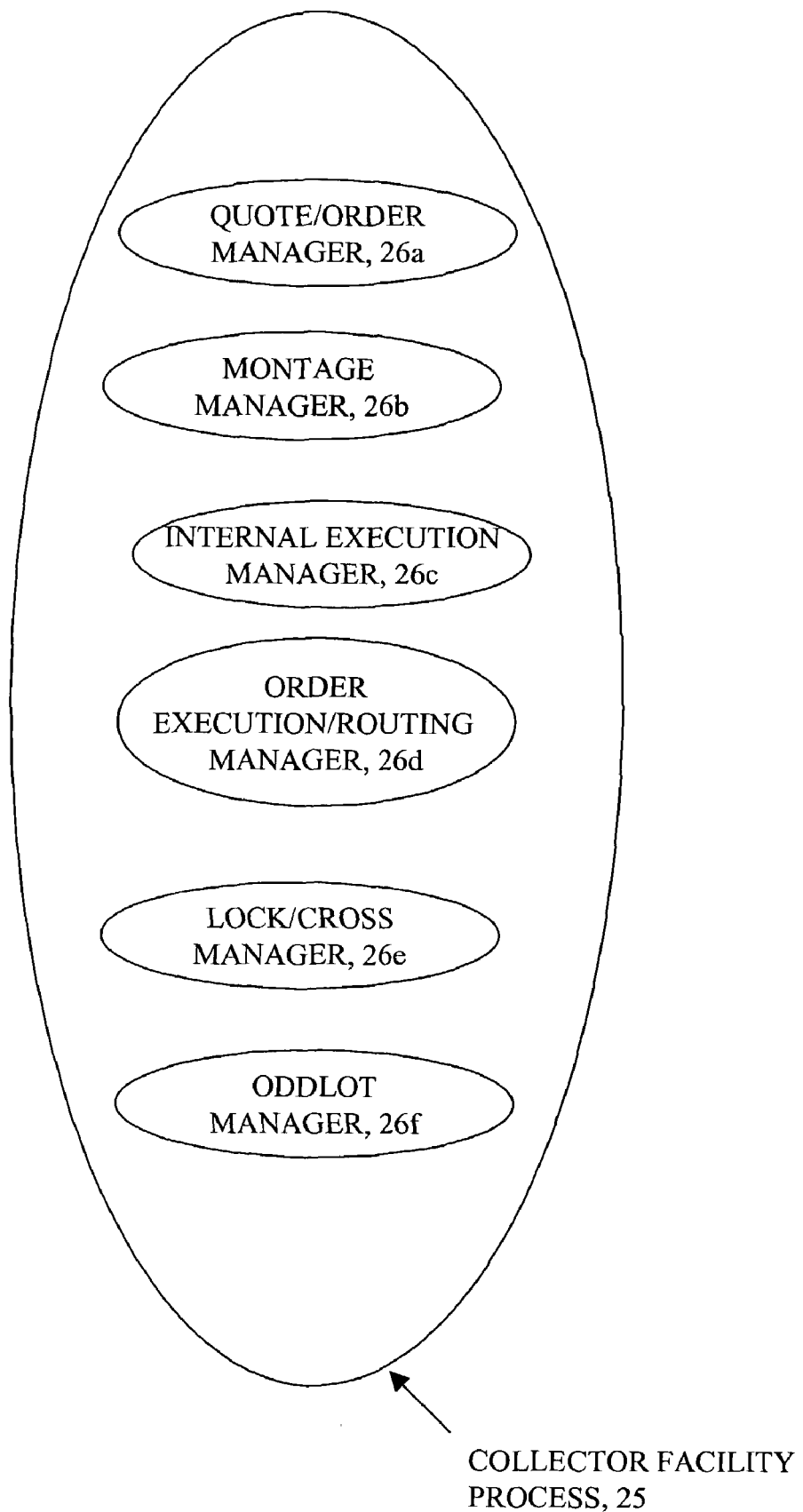
FIG. 2B is a logic view of functions in the quote/order collector facility.

Referring to FIG. 2B, the quote/order collector process 25 is shown. The quote/order collector process 25 provides transmission of multiple orders or quotes at multiple price levels by Quoting Market Participants to a quote/order manager 26a. The quote/order manager 26a provides a unified point of entry of quotes and orders from disparate delivery systems into the quote/order collector system 20 to access quotes/orders displayed (as either attributable or non-attributable) in both the aggregate montage and current quote montage. The quote/order manager 26a manages multiple quotes/orders and quotes/orders at multiple price levels and uses a montage manager 26b to display (either in the Aggregate montage or in the current quote montage) the orders/quotes consistent with an order's/quote's parameters. The order collector process 25 also includes an internal execution process manager 26c to match off executions for quoting market participants at the best bid/offer. The order collector system 20 also includes an order execution/routing manager 26d providing a single point delivery of executions or routing of orders, which substantially eliminates potential for dual liability. That is, order collector process 25 will maintain the order routing and executions functionality available in the SOES$^{SM}$ and SelectNet® systems. The order collector process 25 also includes a lock/cross quote manager 26e, and an odd lot execution manager 26f.

Figure 3A:
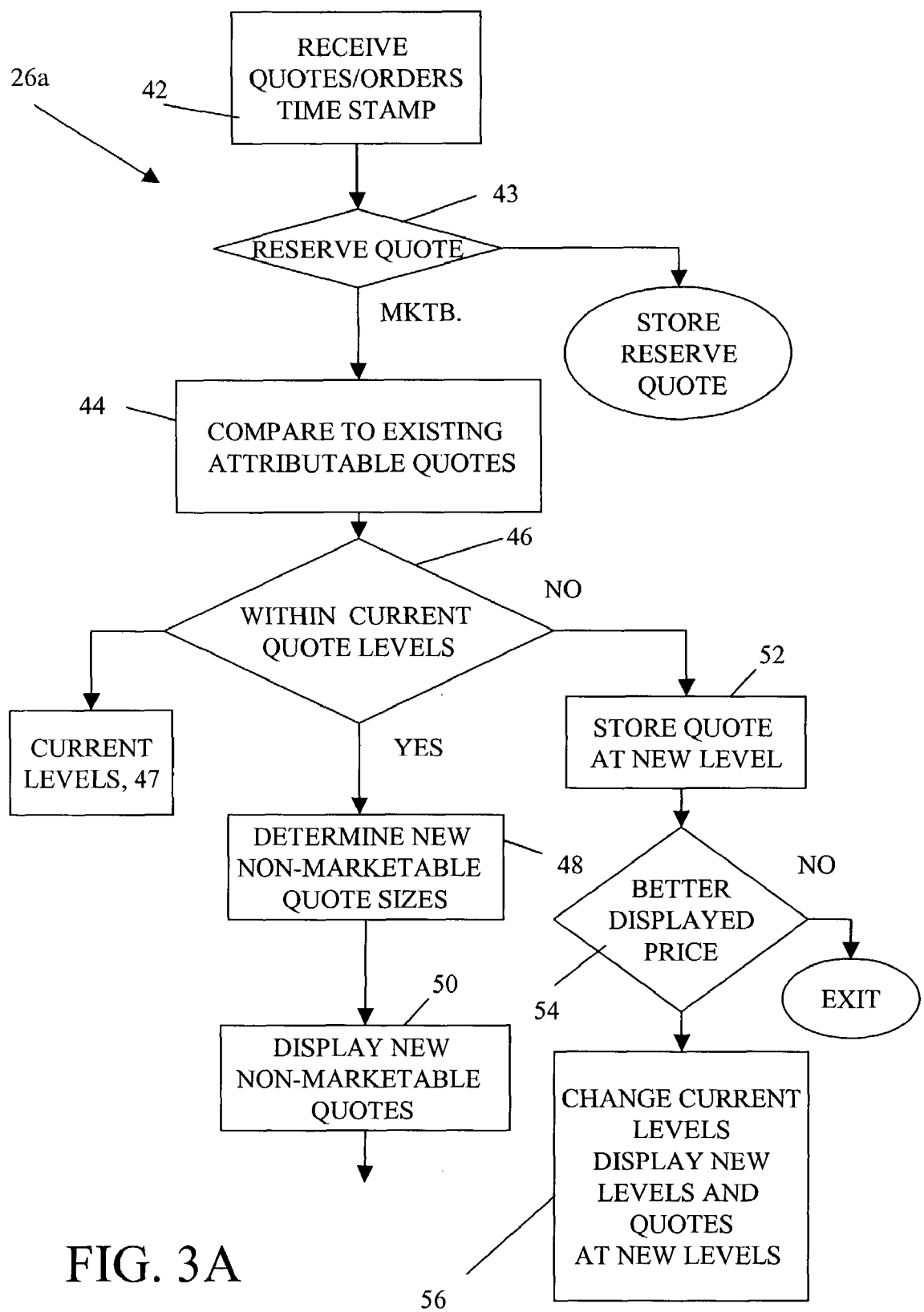
FIG. 3A is a flow chart showing a quote/order manager.

Referring to FIG. 3A, the order collector process 25 receives orders/quotes and time stamps 42 each order/quote upon receipt. This time stamp determines the order's/quote's ranking for automated execution. Quotes/orders are designated as either attributable or non-attributable, and could also have a reserve size discussed above. The order collector process 25 aggregates all of a Quoting Market Participant's attributable and non-attributable orders at a particular price level, and disseminates order/quotation information into the aggregate montage and/or the current quote montage, as will be discussed below.

The order entry process 25 determines 43 whether the received quote/order corresponds to a reserve quote. If the quote does not correspond to a reserve quote then the quote is a displayable quote that is attributable or non-attributable. The order entry process 25 compares 44 the received quotes/orders to existing quotes/orders to determine 46 whether the price of quotes/orders fall in existing quote/order price levels. Any number of quote/order price levels can be accommodated although in this example, only three price levels will be displayable in the non-attributable i.e., aggregate montage. If the quote price is in a displayable price level it is a displayable quote eligible for automated execution. The order collector system 20 can be provided with more price level depth than the three levels, e.g., a depth of 20-25 levels although only a limited number, e.g., three would be displayed at any one time.

If the quote is within one of the pre-defined quote levels, the process 25 determines 48 new non-marketable quote/orders sizes by adding the quote/order size corresponding to the received quote/order to quote sizes at that price level already in the system 20. The process 25 will cause the new non-marketable quote sizes to be displayed 50. If the quote is not within one of the pre-defined quote levels, the process 25 stores 52 the quote at a new price level and determines 54 if it is at a better price. If the quote is at a better price, the process 25 changes 56 current levels to cause a new price level for non-marketable quote sizes to be displayed 50.

Figure 3B:
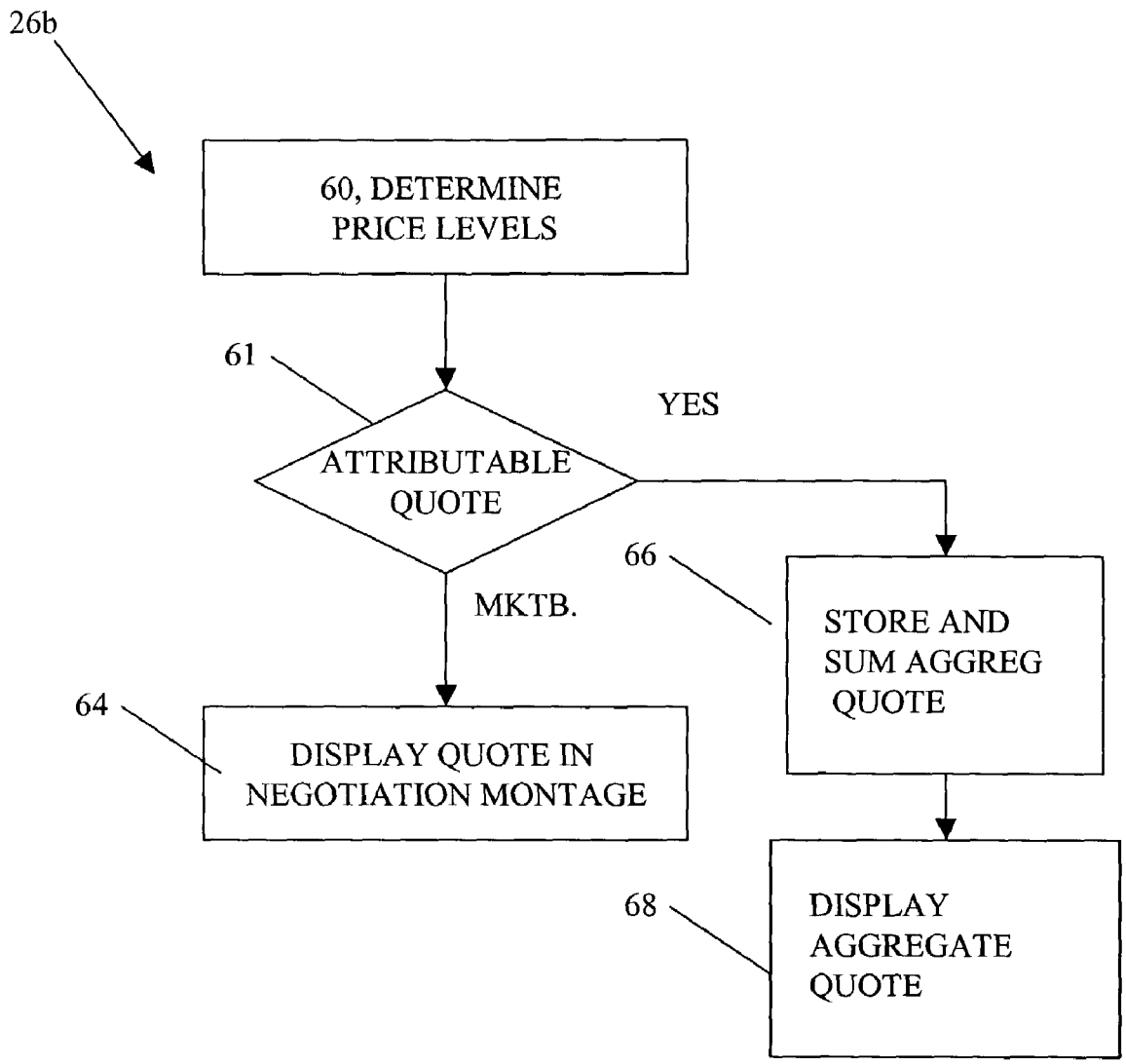
FIG. 3B is a flow chart showing a montage manager.

Referring to FIG. 3B, the montage manager 26b of the quote/order collector process 25 determines 60 which price levels to display and determines 61 if an order is a non-attributable order. If the order is non-attributable, the quote/order collector process 25 will store and sum 66 the quote with like quotes to produce an aggregated quote and display 68 the aggregate size of such orders in the aggregate montage when the orders fall within one of the three top price levels. For attributable orders, the aggregate size of such orders is displayed in the current quote montage once the order(s) at a particular price level becomes the particular quoting market participant's best attributable bid or offer in the current quote montage. This interest will also be aggregated and included in the aggregate montage if it is within the displayed price levels. Market makers and ECNs can have one MMID and possibly an agency MMID against which they can display attributable quotes. If a market maker has an agency quote, attributable orders will be displayed once the order or orders at a particular price level become the market participant's best agency quote.

Quote/order collector facility 20 (shown in FIG. 1) provides several advantages to the market. One advantage is that it ensures compliance with the regulatory rules such as the SEC Order Handling Rules, and in particular the Limit Order Display Rule and SEC Firm Quote Rule. With Quote/order collector system 20 it is less likely that a Quoting Market Participant, because of system delays and or/fast moving markets, will miss a market because the Quoting Market Participant is unable to quickly transmit to the system 20 a revised quote (which may represent a limit order).

Nondirected Orders

Figure 4:
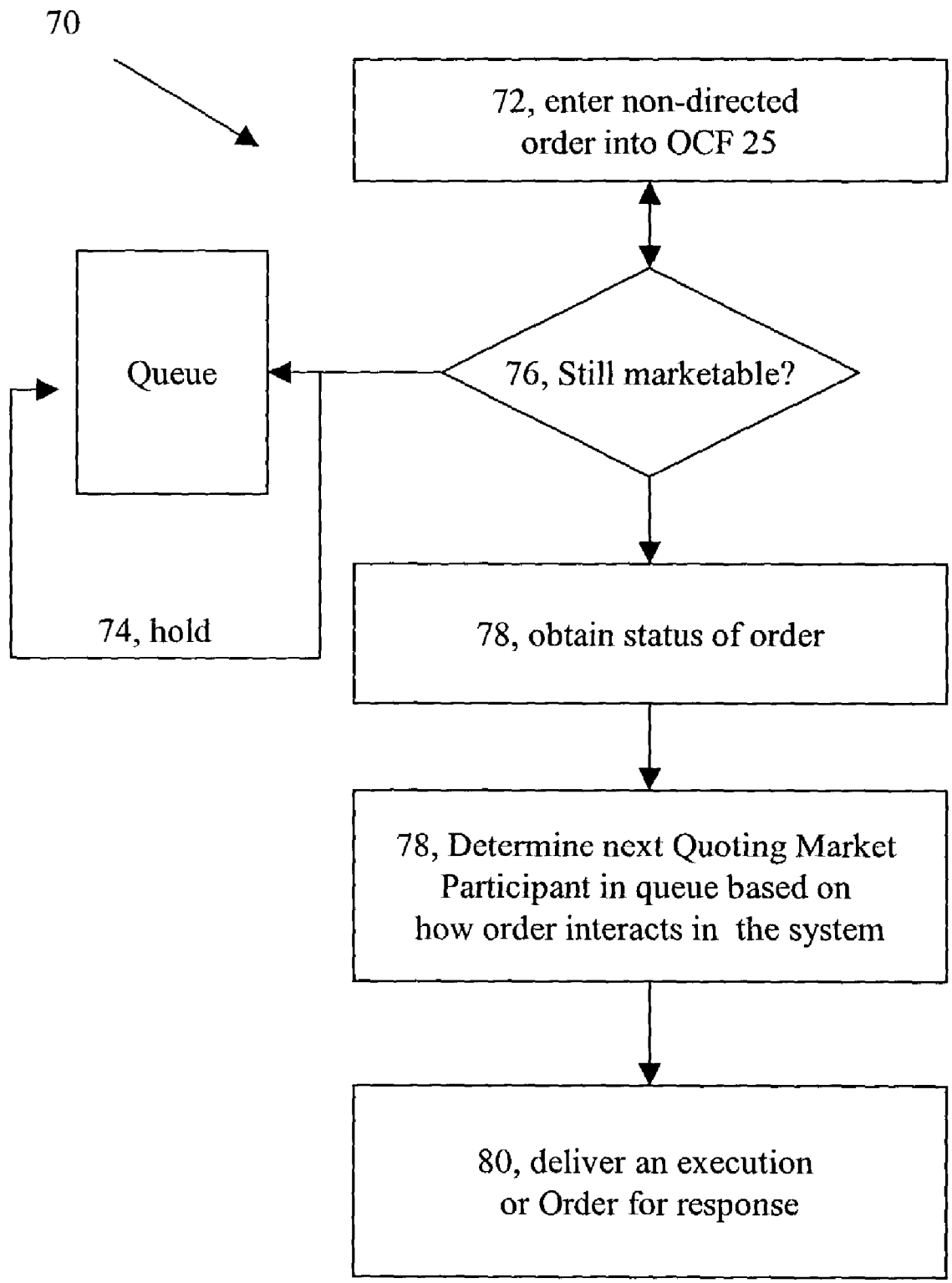
FIG. 4 is a flow chart of an execution/routing manager.

Referring to FIG. 4, a flow chart for an execution/routing process 70 that is associated with the order execution/routing manager 26d (shown in FIG. 2B) is shown such that the market 10 allows market participants that enter Non-Directed Orders three options as to how the order interacts with the quotes/orders in the system 20. An exemplary format was described above in FIG. 1B. These choices are that the orders can execute against displayed contra side interest in strict price/time; or price/size/time; or price/time that accounts for ECN access fees. This can be set by selecting one of the options on the order entry screen (FIG. 1B). As a default, the system 20 can execute Non-Directed Orders in general price/time priority. A non-directed order is an order that is not executed or routed for response to a particular Quoting Market Participant, e.g., a particular market maker or ECN.

A market participant can immediately access the best prices in system 20, as displayed in the aggregate montage, by entering 72 a non-directed order into the collector process 25 (shown in FIG. 1). A non-directed order is designated as a market order or a marketable limit order and is considered a "Liability Order" and is treated as such by the receiving market participant. Once the order has been entered 72 into the collector process, the execution/routing process 70 determines 76 if the order is marketable. Under the current system 20 design, market participants may enter an order up to a size of 999,999 shares into the system for execution. A large market order, or a marketable limit order with a price exceptionally different from the inside price, can execute through several price levels and produce a new inside price unrelated to the previous quotes/orders in the system. Often these large orders are entered unintentionally by market participants who are attempting to enter smaller size orders and erroneously enter the wrong price for their orders. To detect these errors and other similar problems, thresholds are calculated so that such erroneous orders are returned to the entering firm after executing as much of the order as possible up to and including the threshold price.

By calculating a price threshold based on the inside (bid or offer) price, the portion of an entered order that would move the inside price by a certain percentage can be returned to the market participant while the portion of the entered order that would not move the inside price beyond the percentage is executed. After the portion that exceeds price threshold is returned, the market participant has the option to re-enter any of the un-executed portion for later execution. Also, in calculating the price threshold, the percentage of the inside price, used to calculate the price threshold, is adjusted as necessary to protect market participant or as dictated by market conditions in order to prevent unnecessary volatility in the market.

Figure 4A:
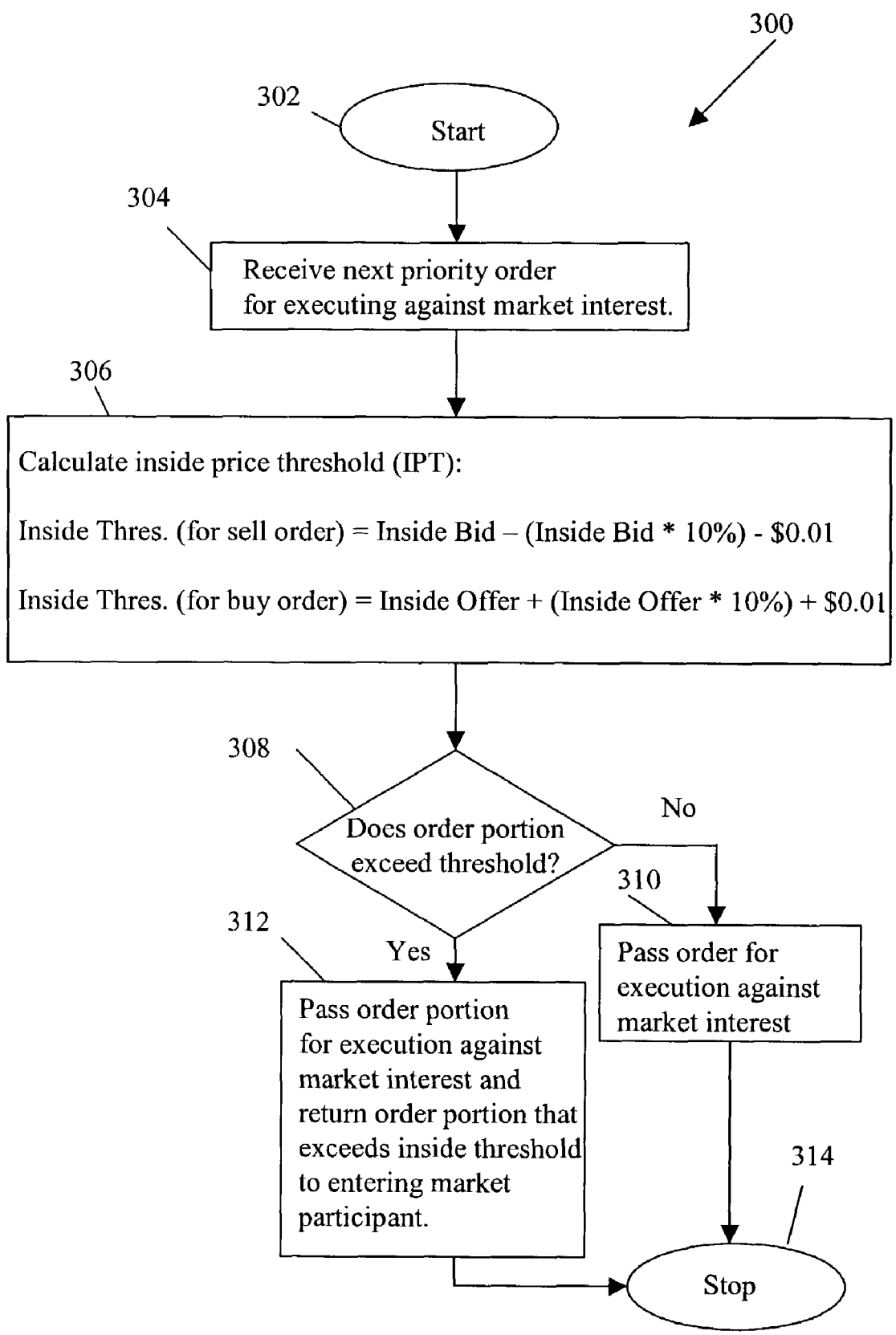
FIG. 4A is a flow chart for calculating and applying an inside price threshold.

Referring to FIG. 4A an inside price threshold process 300 is shown for calculating and applying an inside price threshold to an entered order. The inside threshold process 300 starts 302 when a non-directed order is received by the collector process 25 (shown in FIG. 1) for determining if the order is marketable 76 (shown in FIG. 4). Once the order is entered 304, the process 300 calculates 306 the inside price threshold. For an entered order that is a sell order the inside price threshold (IPT) is the current inside bid less the product of the inside bid and the threshold percentage (chosen here to be 10% although other percentages can be used) and minus a constant (chosen here to be $0.01 although other constant values can be use) as shown in the following equation:

$$IPT\text{(for sell order)}=\text{Inside Bid}-(\text{Inside Bid}*10\%)-\$0.01.$$

For an entered order that is a buy order, for a particular security, the inside price threshold is the current inside offer of the security plus the product of the inside offer and the threshold percent and plus a constant. Similar to calculating the inside price threshold for a sell order, a threshold percentage of 10% (although other percentages can be used) and an constant of $0.01 (although other values can be used) are used in the following equation:

$$IPT\text{(for buy order)}=\text{Inside Offer}+(\text{Inside Offer}*10\%)+\$0.01.$$

However, as mentioned the threshold percentage can be adjusted up or down, for example in increments of 10%, as market conditions dictate. After the process 300 has calculated 306 the inside price threshold, the process applies the threshold to the entered order by determining 308 if a portion of the order exceeds the threshold. If no portion of the order exceeds the threshold, the process 300 passes 310 the order for execution and exits 314. If the process 300 determines that a portion of the order, exceeds the inside price threshold, the order portion that does not exceed the inside price threshold is passed 312 for execution and the order portion that does exceed the inside price threshold is returned to the market participant that entered the order, and then the process 300 stops 314.

To demonstrate an example of the process 300 in operation, a stock Q has a current inside bid price of $10.00. Market participant A enters a market (i.e., unpriced) sell order for 10,000 shares. There are currently bids available to buy 4,000 shares between $8.99 and $10.00, and bids available to buy another 100 shares at $8.98. Using the formula above to calculating inside price threshold (IPT) for a sell order, the IPT is:

$$IPT\text{(for sell order)}=\$10.00-(\$10.00*10\%)-\$0.01=\$8.99.$$

By applying this threshold of $8.99, 4,000 shares of the market sell order will be executed at the prices of $8.99 to $10.00 since none of the prices are below the sell order threshold of $8.99. However, the remaining 6,000 shares are returned to market participant A since the bids for 100 shares at $8.98 are below the threshold price and there is no additional liquidity at or above this inside price threshold.

As discussed above, an inside price threshold can be calculated and applied to non-directed buy and sell orders. However, in some arrangements an inside price threshold may also be calculated and applied to directed orders (discussed below), preferenced orders (also discussed below), or other similar orders.

Returning to FIG. 4, in some arrangements, if a non-directed limit order is marketable when entered into the system 20, for example by not exceeding the inside price threshold, but subsequently becomes non-marketable because of a change in the inside market, the system 20 may hold 74 the order for e.g., 90 seconds and not immediately return the order to the participant. If within the holding period e.g., 90 seconds, the order once again becomes marketable, the system 20 will execute/send the order to the next Quoting Market Participant in the non-directed order queue. Additionally, the order entry participant can obtain 78 the status of the order and request a cancel of such order (not shown). In some embodiments, the hold period can be less or can be eliminated and also can be selectively applied to market participants depending on how they participate in the market.

Upon entry, the collector process 25 (shown in FIG. 1) will determine 80 what market participant is the next Quoting Market Participant in queue to receive an order, based on how the participant desires to have the order interact in the system 20 (also shown in FIG. 1). Depending on how that receiving Quoting Market Participant participates in system 20 (i.e., automatic execution v. order delivery), the collector process 25 will either cause delivery 82 of an execution (via SOES$^{SM}$) or delivery of a Liability Order (via SelectNet).

Order Execution Manager

FIGS. 5, 5A-5D, show processing in the order execution/routing manager 26d (shown in FIG. 2B). The order execution/routing manager 26d will execute non-directed orders against Quoting Market Participant's quotes/orders based on the chosen priority, e.g., contra side interest in strict price/time; or price/size/time; or price/time that accounts for ECN access fees priority. As noted above, each quote/order when entered into the collector process 25 receives a time stamp. The order execution/routing manager 26d will deliver all orders at the best bid/best offer in chosen priority. The order execution/routing manager 26d can first attempt to provide a match off of orders/quotes entered by a Quoting Market Participant if the participant is at the best bid/best offer by calling the internal execution manager 26c (FIG. 4). Thus, the order execution/routing manager 26d will call the internal order execution manager 26c to try to match off a Quoting Market Participant's orders and quotes that are in the system 20 if the participant is at the BBO and receives a market or marketable limit order on the other size of the market.

The system 20 has a default, e.g., a strict price/time priority. If a market participant does not override the default or selects price/time 94, (FIG. 5A) a Non-Directed Order would be executed 96 first against all displayed quotes/order of market makers, ECNs, and non-attributable agency orders of UTP Exchanges, in time priority between such interest. If the order is not satisfied 98 at that level of priority the order will execute 100 against the reserve size of market makers and ECNs in time priority between such interest. If the order still is not satisfied 102, (FIG. 5B) the order will execute 104 against principal quotes of UTP Exchanges, in time priority between such interest.

Alternatively, a market participant can indicate that the orders execute against contra side interest on a price/size/time basis. A Non-Directed Order would execute 106 (FIG. 5A) against displayed quotes and then reserve size based on the size of the displayed quote, and then time if there is a tie in size. Reserve size is executed against based on the size of the related displayed quote/order, not the total amount held in reserve. Under this option, orders are processed first against displayed quotes/orders of market makers, ECNs, and agency quotes/orders of UTP Exchanges in price/size/time priority between such interest. If the order is not satisfied 108 (FIG. 5B) at that level of priority the order will execute 110 against reserve size of market makers and ECNs, in price/size/time priority of such interest, with size priority based on the size of the related displayed quote/order. If the order is still not satisfied 112 (FIG. 5C) at that level of priority the order will execute 114 against principal quotes of UTP Exchanges, in price/size/time priority between such interest.

A third choice enables a market participant to indicate that their order should be executed in a manner that accounts for ECNs quote-access fees. If a market participant selects this option 116, (FIG. 5A) Non-Directed Orders execute 118 (FIG. 5A) first against displayed quotes/orders of market makers, ECNs that do not charge a separate quote-access fee, and non-attributable agency orders of UTP Exchanges. The order can also execute against the quotes/orders of ECNs that charge a separate quote-access fee. In some arrangements the order can execute against the quotes/orders of a fee charging ECN that indicates that price improvement offered by the quote/order is equal to or exceeds the quote-access fee. Also in some arrangements the execution is in time priority between such interest.

If the order is not satisfied 120 (shown in FIG. 5B) at that level of priority the order is executed 122 against displayed quotes/orders of ECNs that charge a separate quote-access fee to non-subscribers. To determine which fee-charging ECN order to execute against, the ECN's are ranked according to the amount of their respective quote-access fee. In some arrangements, the ECNs are ranked such that an ECN associated with a fee is given a higher execution priority than another ECN that charges a larger fee. For example, if two ECN's each offer an order price of $20, but one ECN has an access fee of $0.25 and the other ECN has an access fee of $0.50, the former ECN, with the access fee of $0.25 is given a higher priority and is executed against prior to the latter ECN that charges $0.50 as an access fee. However, if the same quote-access fee charged by two or more ECNs, higher priority is given to the order that was entered earlier in time. If the order is not satisfied 124 at that level of priority the order will execute 126 against reserve size of market makers and ECNs that do not charge a separate quote-access fee to non-subscribers, as well as reserve size of quotes/orders from ECNs that charge a separate quote-access fee to non-subscribers. Similar to executing against the ECN orders in step 122 (shown in FIG. 5B), the reserve size of the ECNs that charge a quote-access fee are ranked according to the amount of the fee and are subsequently prioritized by order entry time if two or more of the ECNs charge the same fee. In some arrangements only ECN reserves offering a price improvement equal to or excess of the quote-access fee are executed against. If the order is not satisfied 128 at that level of priority the order will execute 130 against principal interest of UTP Exchanges, in time priority between such interest.

Figure 5A:
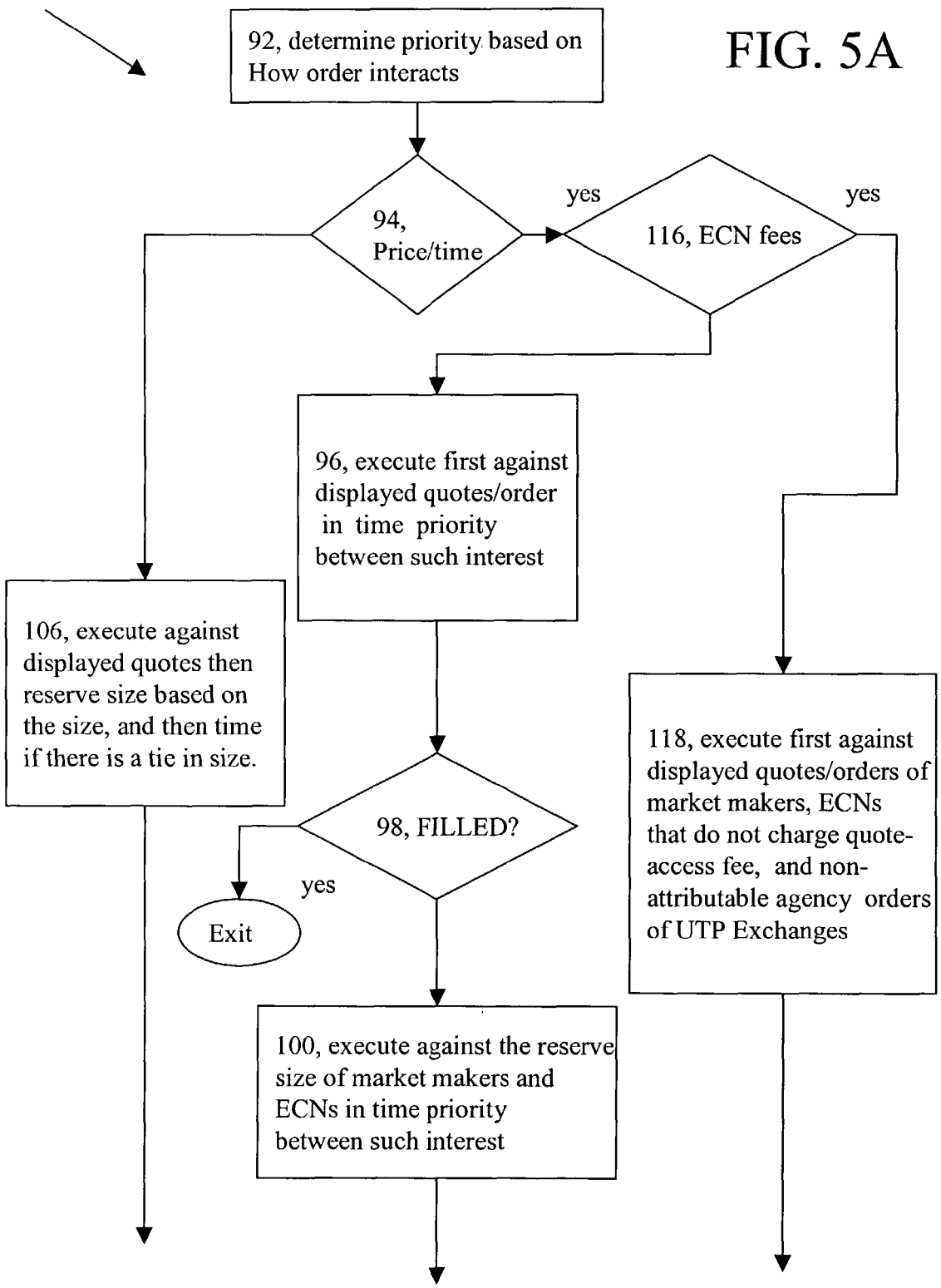
FIGS. 5A-5D are flow charts depicting details of the execution/routing process.
Figure 5B:
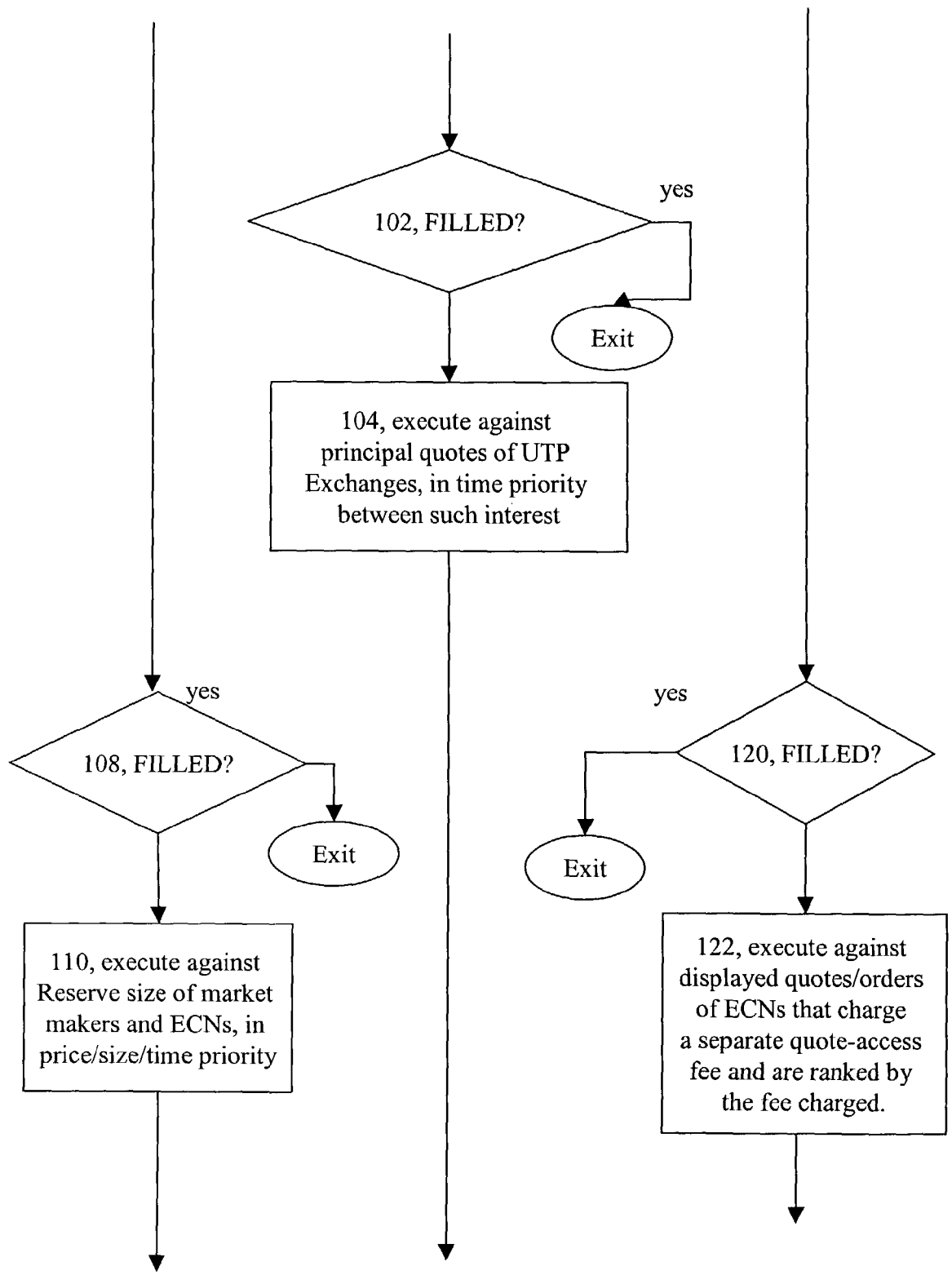
Figure 5C:
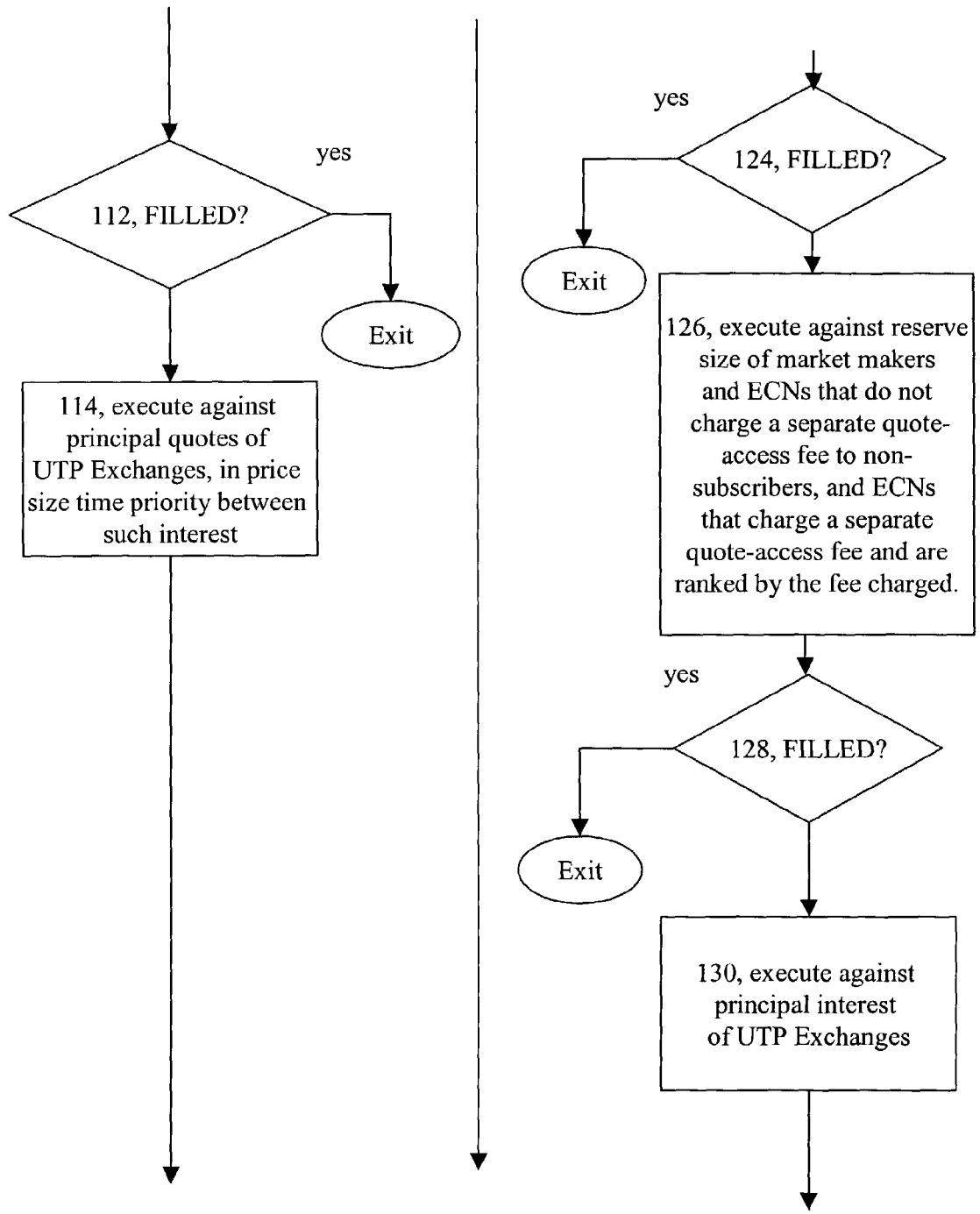
Figure 5D:
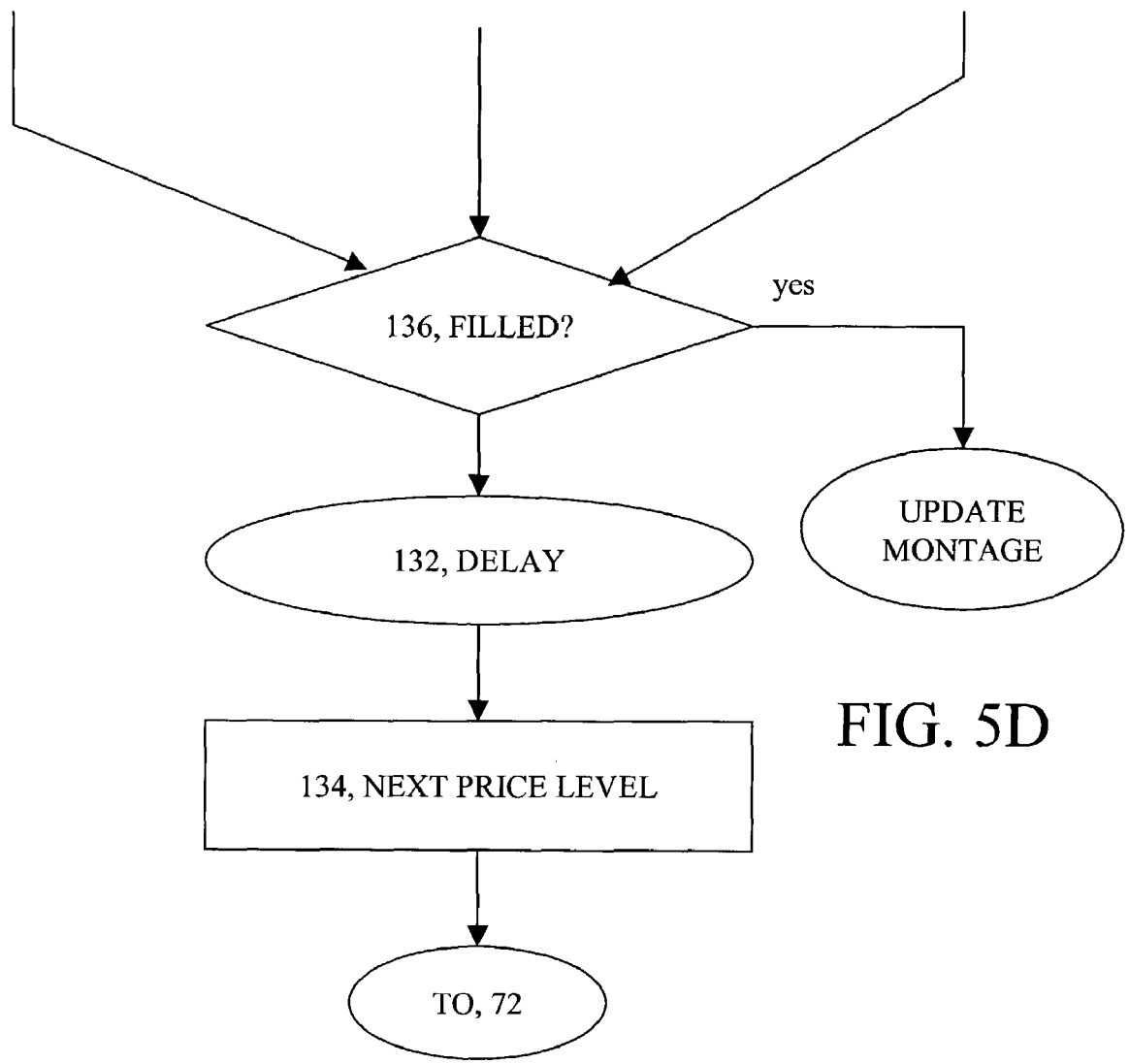
Figure 5E:
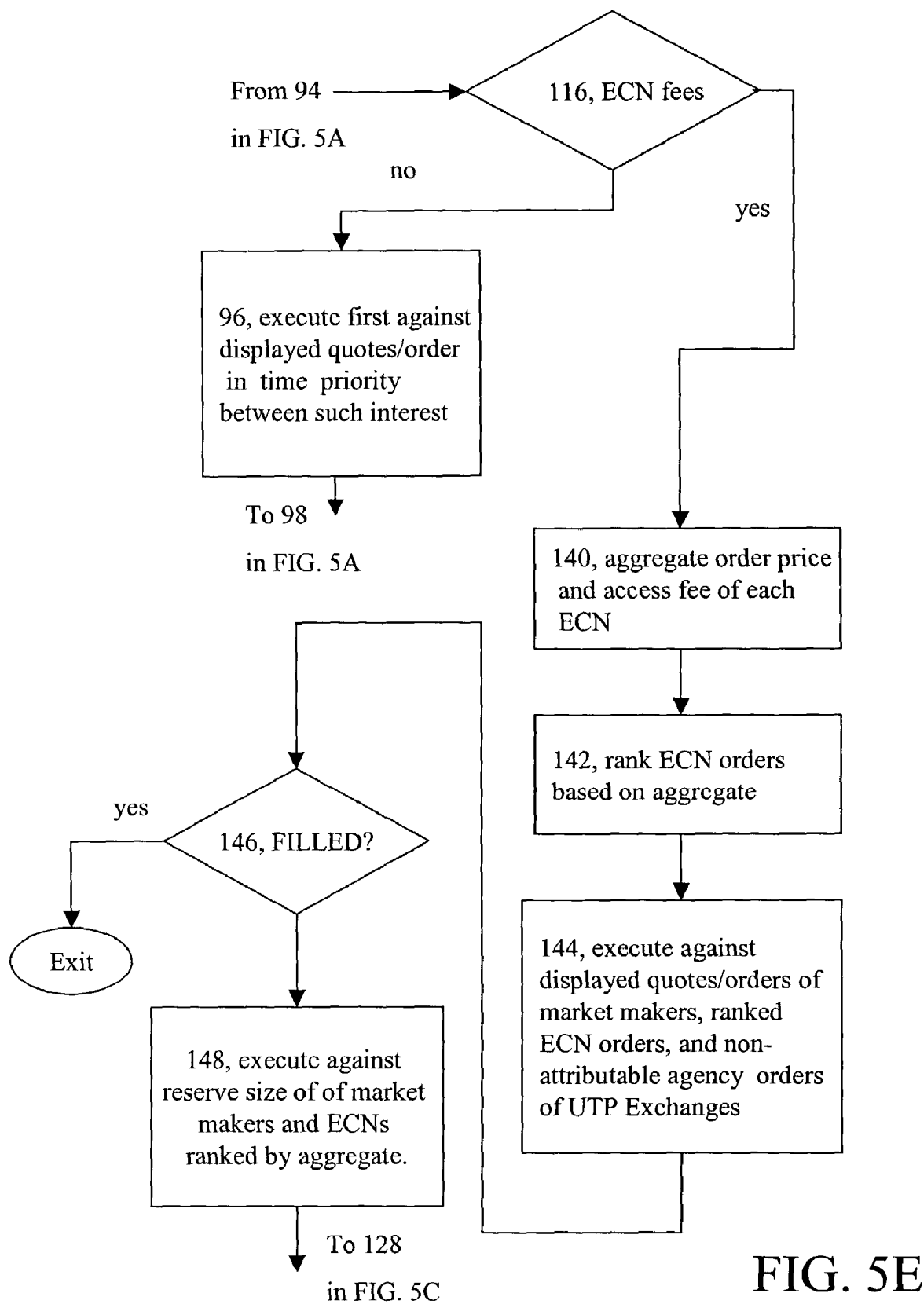
FIG. 5E is a flow chart depicting another arrangement of a portion of the execution/routing process.

Referring to FIG. 5E, in some arrangements of the execution/routing process 70, ECNs that charge a quote-access fee are ranked with the ECNs that do not charge a fee. To rank both types of ECNs, the order price of each respective ECN is aggregated with the quote-access fee charged, if any, by that respective ECN. Referring to the figure, if the market participant selects 116 to execute an order in a manner that accounts for ECNs quote-access fees, the execution/routing process 70 aggregates 140 each order price with the quote-access fee, if any, charged by the respective ECN. Once the aggregates are determined for each respective order, the process 70 ranks 142 the ECN orders according to the aggregates. Typically smaller aggregates are given a higher execution priority than a larger aggregate. For example, an ECN with a $20 order and a $0.25 quote-access fee is given a higher priority than an ECN also with a $20 order but with a $0.50 quote-access fee because the aggregate of the first ($20.25) is smaller than the aggregate of the second ($20.50).

Also, in some arrangements each order price is rounded such that factions of a cent are rounded to the nearest cent prior to displaying the order price to a market participant. Typically bids are rounded down to the nearest cent and offers are rounded up to the nearest cent. However, when aggregating the order price and the quote-access fee, the order price is not rounded prior to determining the aggregate. For example, an ECN with an offer order price of $19.995 is rounded up to $20.00 for displaying to the market participant. But when aggregating the order price and the quote-access fee of $0.005, the aggregate is $20.00 and is based on the offer order price of $19.995. In this case, the $20.00 aggregate is given a higher execution priority than the two previously calculated aggregates ($20.25 and $20.50) above. Also, for an ECN that does not charge a quote-access fee, a fee value of $0.00 is used to determine the aggregate. Also, if any two or more aggregates have the same value, the earlier entered order in time is given a higher priority to execute against.

After the execution/routing process 70 ranks 142 the aggregates, the process executes 144 against displayed quotes/orders of market makers, the ranked ECN orders, and non-attributable agency orders of UTP exchanges. If the order is not satisfied 146 at that level of priority the order will execute 148 against the reserve size of the market makers and the ECNs that are also ranked by their respective aggregates. If the order is not satisfied 128 (shown in FIG. 5C) the execution/routing process 70 continues as shown in FIG. 5C.

With all three approaches, the market 10 would make an exception for Non-Directed Orders entered by a market participant when that market participant is also at the inside market. In that case, the system 20 will match off the Non-Directed Order to buy/sell against that market participant's inside quote/order to sell/buy, in lieu of sending it to the participant next in the queue. Additionally, there would be an exception for "Preferenced Orders" described below.

The Non-Directed Order Processing takes into consideration that factors other than cost or access fees may be important to market participants in making investment decisions. The system 20 (shown in FIG. 1) gives market participants the choice to determine how best to execute their customer or proprietary orders. The execution algorithm/logic for Non-Directed Orders provides a flexible approach allowing market participants choices of how best to interact with the market. This processing is an attempt to address best execution concerns while being flexible to meet participant's needs without imposing a needlessly rigid structure similar to a central limit order book ("CLOB"). Additionally, a strict price/time priority (without choice) would force the public investor to pay ECN quote access fees, thus squashing competition.

Referring to FIG. 5D, if the order is not filled 136, the order execution/routing manager 26d will move 134 to the next price level, after a predefined delay, e.g., a 5 second interval delay 132 before attempting to execute an order at the new price level. The price-level interval delay will give market participants time to adjust their quotes and trading interests before the market moves precipitously through multiple price levels, which may occur when there is news, rumors, or significant market events. Thus, the price-level interval delay is a modest and reasonable attempt to limit volatility. In some embodiments this delay can be eliminated.

In some arrangements, an ECN order executed against in the execution/routing process 70 (shown in FIG. 5A-D) is entered into the quote/order collector system 20 (shown in FIG. 1) including the quote-access fee associated with the respective ECN along with the order price. By providing the fee in the order (i.e., a summary order) the aggregate of the order price and the quote-access fee is calculated from the information included in the order.

Directed Orders

Figure 6A:
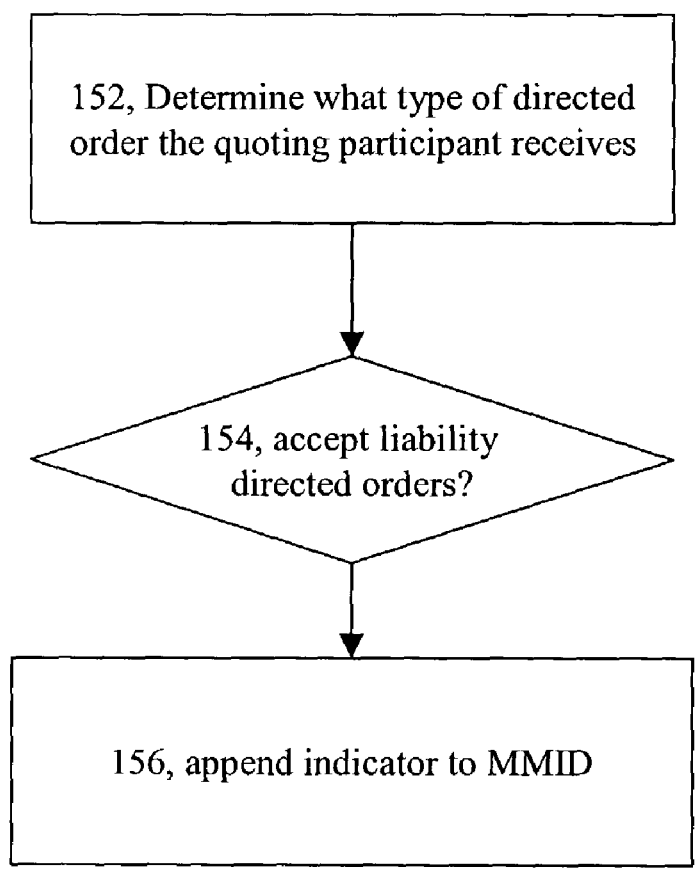
FIGS. 6A-6B are flow charts depicting processing for Directed Orders.

Referring to FIG. 6A, directed order processing 150 is shown. The current quote montage allows Quoting Market Participants to advertise their buying or selling interest. Directed Order processing rules in system 20 (shown in FIG. 1) allow ECNs and market makers to elect to receive liability orders against their quote. A market maker or ECN could choose to receive a Directed Order that is also a liability order, or could also choose to accept only non-liability Directed Orders. The market maker or ECN designates that it desires to receive directed order as liability or non-liability, i.e., negotiation orders. Each market participant can inform the market on how it desires to receive directed orders. In some embodiments this can be across all stocks traded by the market participant whereas in other embodiments it could be on a stock by stock basis.

The system 20 fetches information from a profile set up for the market participant to determine 152 the type of directed order the quoting market participant accepts. The process 150 determines 154 if the quoting market participant chooses to accept directed liability orders. If the quoting market participant chooses to accept directed liability orders the system 20 appends 156 an indicator to the quoting market participant's MMID, showing that the market participant is available to receive directed liability orders.

Figure 6B:
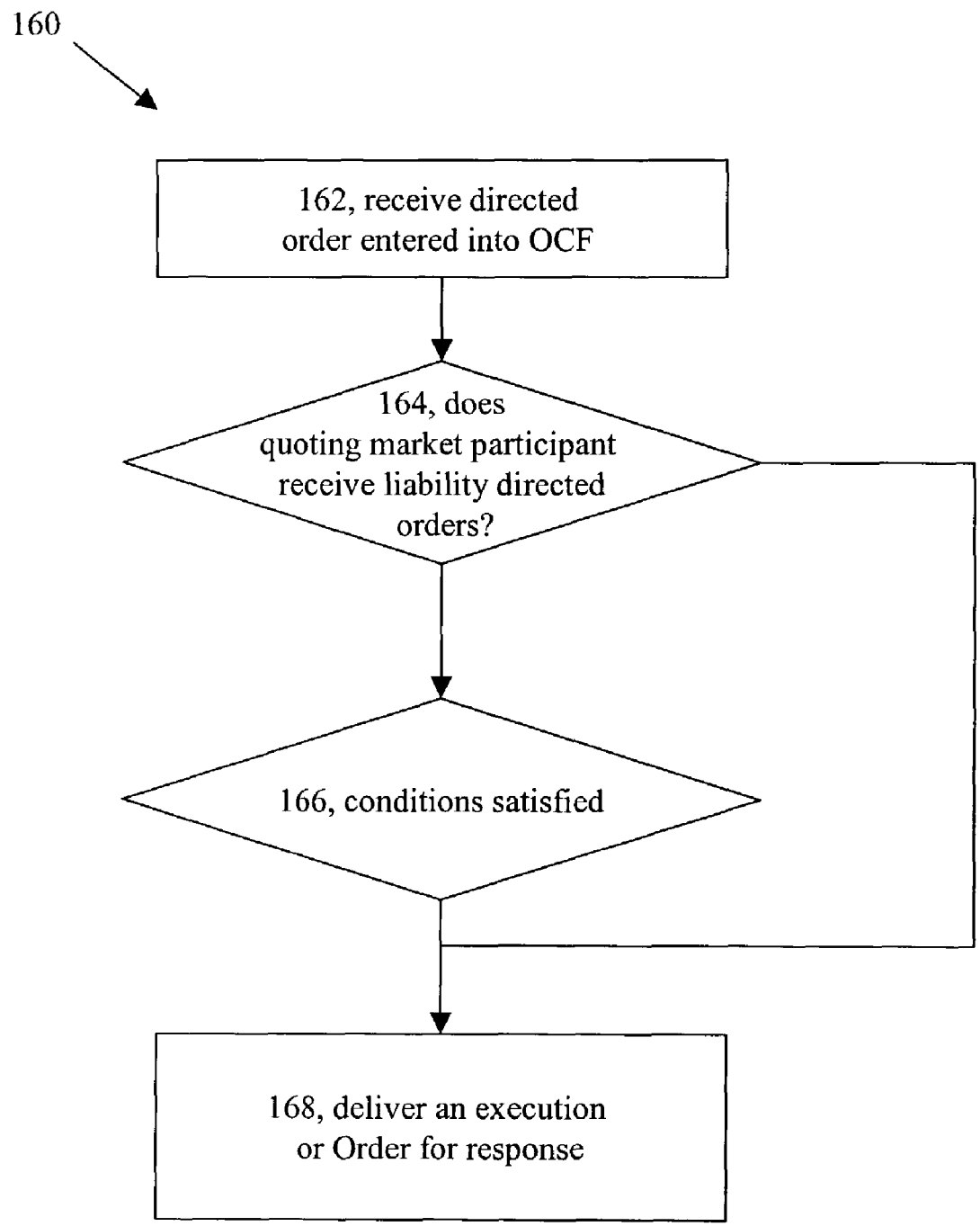

Referring to FIG. 6B, for a process 160 to access a specific quote in the current quote montage, the system 20 receives 162 a "directed order" entered by a market participant into the system 20 to begin the negotiation process with a particular Quoting Market Participant. The participant enters a Directed Order into the system 20 via an interface at a client system. This is accomplished by using a mouse or other device to access a specific Attributable Quote/Order displayed in the Quotation Montage, discussed below. An example of directed order entry is shown in FIG. 9.

The process 160 determines 164 if the Quoting Market Participant to which a Directed Order is being sent has indicated that it wishes to receive Directed Orders that are Liability Orders. Such liability directed orders must be designated at the time of entry as an "All-or-None" order ("AON") or a "Minimum Acceptable Quantity" (MAC) order. The system 20 will check 166 to make sure that these conditions are satisfied. An AON order is an order that is at least one normal unit of trading (e.g. 100 shares) in excess of the Attributable Quote/Order of the Quoting Market Participant to which the order is directed. A "Minimum Acceptable Quantity" order ("MAQ") has a size value of at least one normal unit of trading in excess of Attributable Quote/Order of the Quoting Market Participant to which the order is directed. The Directed Order may have a time in force of e.g., 1 to 99 minutes. In some embodiments, the liability orders can have other characteristics that would make it a non-liability orders under regulatory or market rules.

If the order is a valid liability order or a non-liability order, the order is routed 168 by the system 20 to a specific MMID designated by the market participant. Directed Orders are always delivered for response (accept or decline), as opposed to an automatic execution via the system 20 against the receiving market participant's quote. Directed Orders can access liquidity held by a specific market maker or ECN. Directed Orders are processed independent of the Non-Directed Order queue.

In prior systems, the purpose of a non-liability designation was to limit the potential for dual liability that results from having two (non-linked) points for delivering liability orders against the same market maker quote. With this approach the directed order options allow a market participant to set-up order routing arrangements that are outside of the directed order process and provide executions to incoming orders in amounts that are in excess of displayed quotes. This would be of special interest to institutional market makers and ECN's.

Preferenced Orders

Figure 7A:
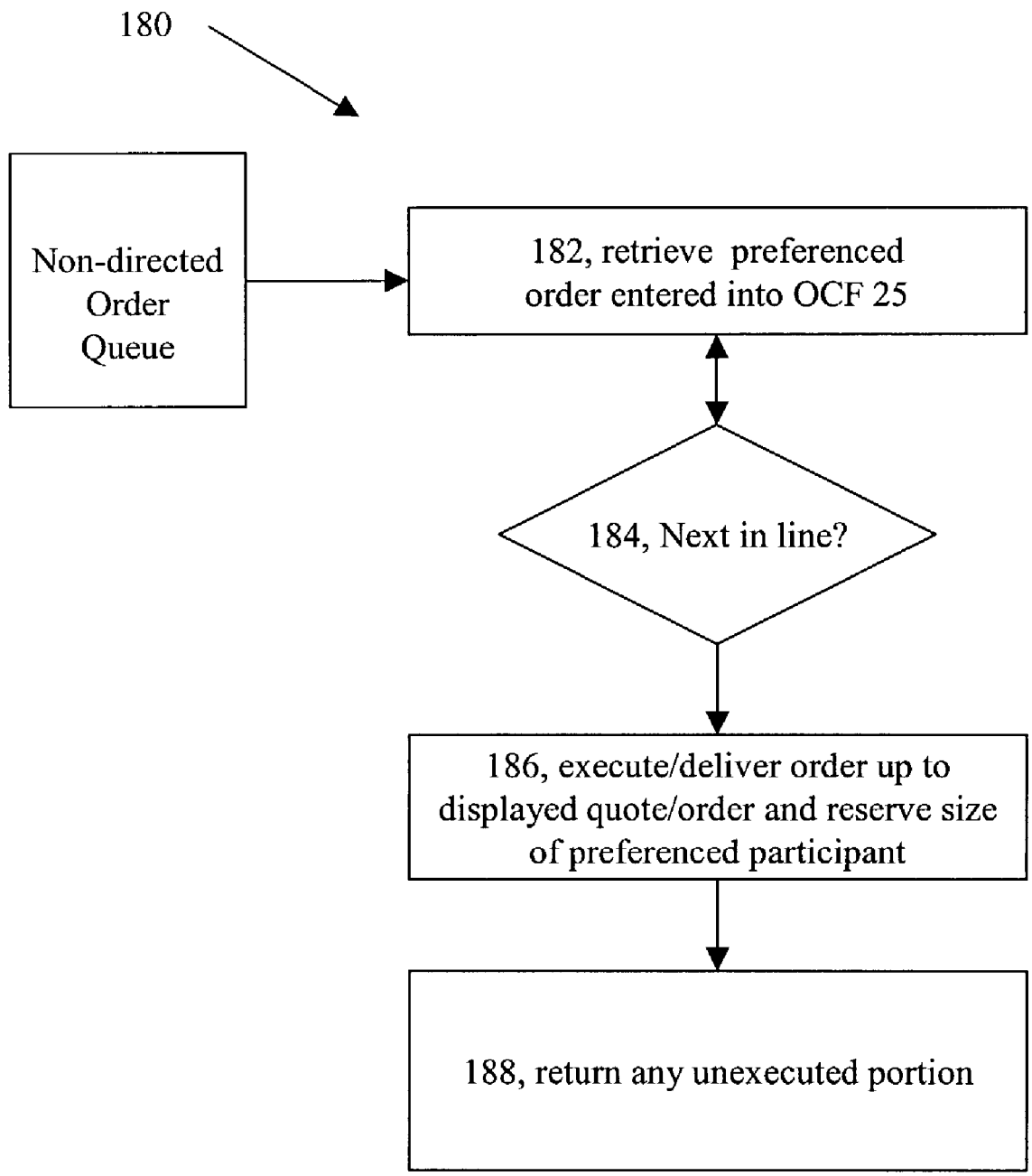
FIGS. 7A-7B are flow charts depicting processing for Preferenced Orders.

Referring to FIG. 7A, processing 180 for a class of orders referred to as "Preferenced Orders" is shown. A preferenced order is an order that is preference to a particular quoting market participant e.g., market maker or ECN. Preferenced Orders can be of two types. Preferenced Orders of either type are entered into the system 20 (shown in FIG. 1) through the Non-Directed Order Process. The market participant entering the Preferenced Order designates the quoting market participant by its identification symbol ("MMID"). Preferenced Orders are processed in the same "queue" as Non-Directed Orders.

The Preference Order is considered a liability order. As with Non-Directed Orders, a Preferenced Order will be delivered as an order to a market participant that does not participate in the automatic execution functionality of the system 20, or will be delivered as an execution against the preferenced market maker, as well as market participants that choose to accept auto-execution.

The process 180 retrieves 182 preferenced orders from the Non-Directed Order queue 183 and determines 184 when a Preferenced Order is next in line to be executed from the Non-Directed Order queue. The process 180 will execute 186 against (or will deliver an order in an amount up to or equal to) both the displayed quote/order and reserve size of the quoting market participant to which the order is being preferenced ("preferenced quoting market participant"). Any unexecuted portion may be returned 188 to the entering market participant.

Figure 7B:
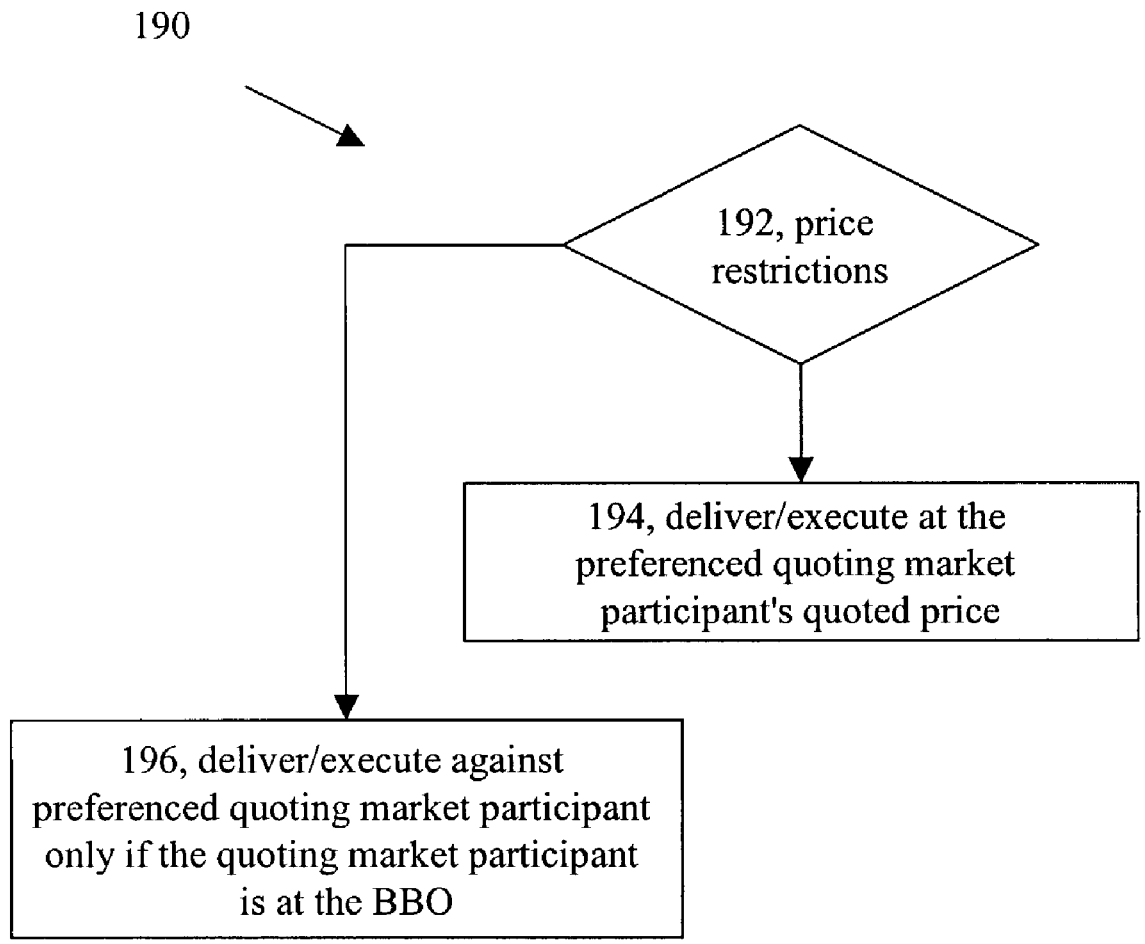

Referring to FIG. 7B, processing 190 of preferenced orders is shown. One type of Preferenced orders is a Preferenced Order with "No Price Restrictions" and another type is a Preferenced Order with "Price Restrictions." In some embodiments the system 20 could include both types while in other embodiments, the system 20 would include one but not the other type. If the embodiment included only one type then the processing described here would be somewhat different. For an embodiment having both types, the processing 190 determines 192 if there are price restrictions.

For Preferenced Orders with No Price Restrictions 194 the next in-line Preferenced Order will be executed (or delivered for execution) at the preferenced quoting market participant's price, regardless of whether the quoting market participant is at the best bid/best offer ("BBO"). The execution will occur at the preferenced quoting market participant's quoted price. Thus, under this approach, Preferenced Orders may be executed at the BBO or outside the BBO.

The purpose of this type of Preferenced Order is to maintain functionality similar to that which currently exists in Nasdaq. That is, today market participants often use the SelectNet service to send orders to market makers or ECNs who are quoting at the BBO or away from the BBO. Market participants sometimes attempt to "sweep the street" or access liquidity at or near the inside market. A market maker that is "working" an institutional order may also send a SelectNet message to a market maker or ECNs who is quoting away from the inside. This may occur if the market maker believes the market participant has greater size to offer, and thus will result in a more efficient execution for the institutional customer. This functionality does not obviate best execution obligations.

With Preferenced Orders with Price Restrictions 196 there will be price restrictions that accompany the Preferenced Orders. That is, when a Preferenced Order is next in line to be executed from the Non-Directed Order queue, the Prefer-enced Order will be executed (or delivered for execution) against the preferenced quoting market participant to which the order is being directed only if the quoting market participant is at the BBO (up to the displayed and reserve size). If the quoting market participant to which the order is being directed is not at the BBO when the Preferenced Order is next in line to be delivered or executed, the Preferenced Order will be returned to the entering participant. Thus, under this approach, Preferenced Orders only will be executed at the BBO, and only if the preferenced quoting market participant is quoting at the BBO at the time of order delivery (or execution).

Comparison of Directed Orders and Preferenced Orders.

The Directed Order and Preferenced Order features provide different options for order processing. The Directed Order Process operates much like SelectNet operates in the current environment except that the current system 20 (shown in FIG. 1) offers a choice of how the directed orders are treated by the quoting market participants. Directed Orders will be delivered to a single market participant that is designated by MMID by the sender of the order. Directed Orders are always delivered for response (e.g., accept or decline), as opposed to an automatic execution against the receiving market participant's quote. Directed Orders will not decrement a quote.

Preferenced Orders on the other hand share some functionality with Non-Directed Orders, in that they are processed in time sequence, will be delivered to a quote/order or will automatically execute against a quote/order of a market participant, and will decrement the size of a quote/order. Unlike Non-Directed Orders, however, Preferenced Orders are not processed pursuant to one of the three order execution algorithms described above.

Figure 8:
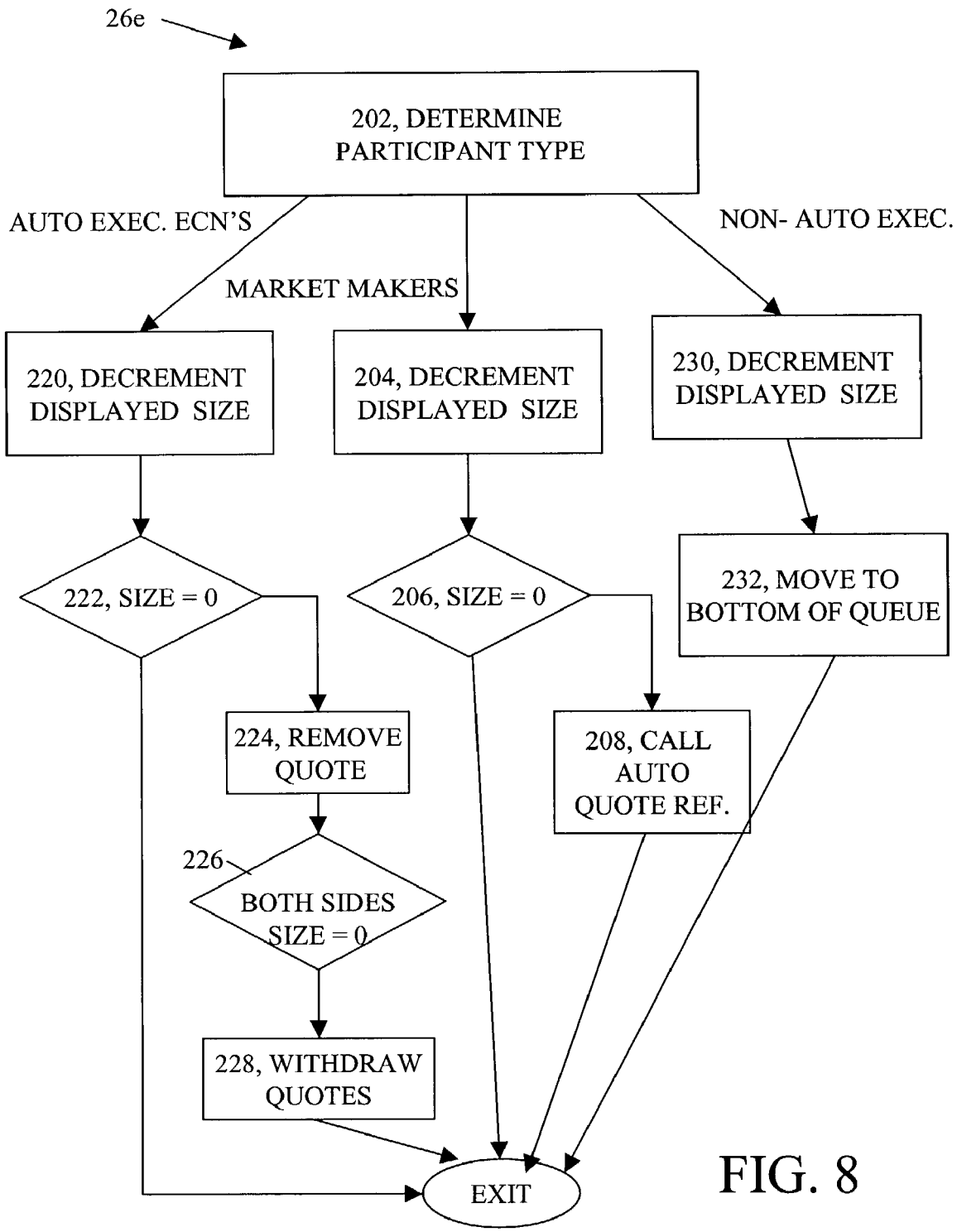
FIG. 8 is a flow chart of a quote montage update manager.

Referring to FIG. 8, a quote update process in the quote size manager 26e is shown. The process determines 202 participant type. If an execution is delivered to a Quoting Market Participant if that participant accepts automatic executions (i.e., market makers or ECNs that choose to accept automatic executions via the SOES$^{SM}$), quote size manager 26e will automatically decrement 204 the aggregate quote in the aggregate montage by the size of the incoming order, and the Quoting Market Participant's quote in the current quote montage if the quote/order is attributable. For Quoting Market Participants who accept automatic execution, if the participant's displayed size is decremented to zero 206, the Quoting Market Participant's displayed (attributable or non-attributable) size will be replenished from reserve if the market participant has reserve size by calling 208 an auto quote refresh.

If an ECN accepts automatic execution via SOES$^{SM}$ its display size will be decremented 220, and if its quote is exhausted to zero 222 without update or without transmission of another attributable quote/order, quote size manager 26e will zero out 224 the one side of the quote that is exhausted. If both the bid and offer size of the ECNs market is reduced to zero 226 without update or transmission of another attributable quote/order, the ECN will be placed into an excused withdrawal 228 and restored once the ECN transmits revised quotes.

For Quoting Market Participants that do not participate in automated execution, e.g., ECNs that opt out of automatic execution and UTP Exchanges that only participate in order delivery, the execution manager 26d will deliver a Liability Order of a size that is equal to or less than the participant's quoted size. System 20 will automatically decrement 230 the participant's 222 quote by the size of the order delivered, but quote size manager 26e will move 232 the participant to the bottom of the queue and not deliver another order to such Quoting Market Participant until the Quoting Market Participant has processed the order by providing a complete or partial fill of the order. If such Quoting Market Participant declines or partially fills the order, System 20 will send the order (or remaining portion thereof) back into the queue for delivery to the next available Quoting Market Participant. In addition, if the Quoting Market Participant declines or partially fills the order, or if the participant fails to respond in any manner within a number of seconds of order delivery (e.g., 30 seconds), System 20 will presume equipment failure and will take corrective action.

For ECN's, quote size manager 26e will zero out that side of the ECN's market, and for UTP Exchanges quote size manager 26e will place the participant at the lowest bid and highest offer price for a trading unit e.g., 100 shares until updated. This is necessary to ensure that Quoting Market Participants that do not provide timely executions due to equipment or other failures do not hold up the market and cause queuing of orders within the system 20. As noted previously, market makers will be required to maintain a two-sided, attributable proprietary quote (other than its Agency Quote) in system 20 at all time. To assist with this requirement, market makers can use an AutoQuote Refresh ("AQR") process e.g., that available in the SOES$^{SM}$.

When a market maker's proprietary quote (both displayed and reserve) is exhausted to zero, the system will refresh the market maker's price on the bid or offer side of the market, whichever is decremented to zero, by an interval designated by the market maker and the market makers size to a level designated by the market maker. When the market maker's quote is refreshed, however, the AQR will refresh the market maker's attributable quote/order (not the non-attributable quote). AQR will not be available for Agency Quotes. Additionally, if a market maker does not use AQR but otherwise has another attributable proprietary quote in System 20, System 20 will automatically display the market maker's next best attributable proprietary quote when its current attributable quote is exhausted.

If a market maker's quote is decremented to zero and does not update its non-agency quote via AQR, transmit a revised attributable quote to System 20, or have another proprietary attributable quote/order in system 20, system 20 will place the market maker's quote (both sides) in a closed state for a short period of time, e.g., three minutes. At the end of that time period, if the market maker has not on its own updated its quote or voluntarily withdrawn its quote from the market, System 20 will refresh the market maker's quotation to 100 shares at the lowest market maker bid and highest market maker offer currently being displayed in that security and reopen the market maker's quotation.

Montage

Referring to FIG. 9, the system 20 (shown in FIG. 1) uses a composite montage 250. One component of the composite montage 250 is the current montage 254 that exists in the current Nasdaq Workstation II, (NWII) presentation. The current montage 254 has two primary display components. One component 255 is the Market Minder Window, which allows market participants to monitor price activity (inside bid/offer and last sale) of selected stocks, and the Dynamic Quote window, which shows for a particular stock the inside bid and offer, the last sale, change in price from previous close, daily high and low, volume, and the short sale arrow indicator. The other component is current quote montage 257. The current quote montage 257 shows for a particular stock two columns (one for bid, one for ask), under which is listed the MMIDs for each registered market maker, ECN, and UTP Exchange in the particular stock and the corresponding quote (price and size) next to the MMID. System 20 ranks the bids and offers along with the corresponding MMID in price/time priority. Accordingly, the market participant at the best bid who is first in time appears first in the montage, the market participant at the best bid (or the next best bid) who is next in time is ranked second, and so forth.

Market makers are required to submit a two sided proprietary quote, and ECNs that participate in System 20 may submit a one or two sided quote. UTP Exchanges generally submit two sided quotes, which represent the exchange specialist's best quote in the stock at issue. While a market maker's quoted price and size is attributed to the market maker by the corresponding MMID, this may not represent the market maker's best price if the market maker has placed a better priced order into an ECN that complies with the Display Alternative Rule or designate its better priced quote as non-attributable.

Accordingly, a market maker may be displaying in the current quote montage a proprietary bid of $20 when the market is $20⅛ to 20¼, but the market maker may be displaying in a qualifying ECN a bid of $20 1/16. The $20 1/16 quote may only be seen by subscribers of the ECN in which the market maker has placed the order and is not visible to the system 20 or market participants unless and until $20 1/16 becomes the best bid in the ECN.

A Quoting Market Participant may indicate that a quote/order has reserve size. Reserve size will apply to a market maker's proprietary as well as Agency Quote, and the market maker may be required to display a minimum number of shares, e.g., 1,000 shares. Reserve size will replenish displayed size (attributable only or non-attributable) by at least 1,000 shares (or a default amount) once displayed size is decremented to zero. Reserve size along with displayed (both attributable and non-attributable) size, will be accessible through system 20. Reserve size, however, will not be displayed in either the aggregate montage or the current quote montage. As described above, system 20 will access reserve size after all displayed size is exhausted.

The current quote montage 254 also includes a special MMID (here referred to as "SIZE") that represents the aggregate size of all non-attributable quotes/orders at the best bid/best offer displayed in the current quote montage 254 along with the other MMIDs for the Quoting Market Participants displaying attributable size at the inside. There is one "SIZE" MMID for the bid and offer side of the market. The aggregate size of the best bid/best offer displayed in the aggregate montage will equal the sum of the SIZE MMID displayed and the individual sizes of the MMIDs at the best bid/best offer displayed in the current quote montage. The "SIZE" MMID is provided to properly calculate and disseminate the system 20 best bid and best offer ("BBO") along with the accompanying market center, e.g., for a national quotation service.

System 20 provides a "Summary Scan" function as part of the aggregate montage. The Summary Scan function is a query function that can provide information at the total displayable size (attributable and non-attributable) for all levels. The Summary Scan anonymously displays interest (attributable and non-attributable) at each price level on both sides of the market, but is not dynamically updated.

The system 20 can use "point-and-click" window-type technology so that market participants can enter non-directed or preferenced marketable orders by simply clicking on controls in aggregate quote montage 254 in the window 250. For example, each of the entries in the aggregate quote montage 254 can be a control button so that a simple click on the control, e.g., the total shares displayed 255a (FIG. 4) can activate an execution. The click with a mouse or the like at the inside bid in the top-half of the window 250 could enter a "default" order priced at the displayed price for the displayed shares. The system 20 would allow a trader to set a "default" number of shares, e.g., 1000 shares. For example, whenever a trader clicked on the aggregate shares displayed at the inside bid the trader's system 12 would generate an order for 1,000 shares at the inside price. In addition, a "right-click" on the aggregate display would permit a trader to customize the order at the point of entry. A window can pop up allowing the market participant to enter the information as described in FIG. 1B. Of course some of this information may be automatically entered by the system.

The system can also allow a market participant to enter directed orders in much the same manner by clicking on a quote in the current quote montage. The system will produce a window 260 that allows a participant to enter a size and select if the directed order is "AON" or "MAQ" type.

The execution/routing process 70 (shown in FIG. 5A) described herein is not limited to the software embodiment described above; it may find applicability in any computing or processing environment. The execution/routing process may be implemented in hardware, software, or a combination of the two. For example, the execution/routing process may be implemented using circuitry, such as one or more of programmable logic (e.g., an ASIC), logic gates, a processor, and a memory.

The execution/routing process may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the execution/routing process. The execution/routing process may also be implemented as a machine-readable storage medium, configured with a computer program, where, upon execution, instructions in the computer program cause a machine to operate to perform the functions of the execution/routing process described above.

Embodiments of the execution/routing process may be used in a variety of applications. Although the execution/routing process is not limited in this respect, the execution/routing process may be implemented with memory devices in microcontrollers, general purpose microprocessors, digital signal processors (DSPs), reduced instruction-set computing (RISC), and complex instruction-set computing (CISC), among other electronic components.

Embodiments of the execution/routing process may also be implemented using integrated circuit blocks referred to as core memory, cache memory, or other types of memory that store electronic instructions to be executed by a microprocessor or store data that may be used in arithmetic operations.

A number of embodiments of the invention have been described. Nevertheless, it will be understood that various modifications may be made without departing from the spirit and scope of the invention.

What is claimed is:

1. A computer-implemented method for trading securities in an electronic market, the method comprises:
   receiving by a server system an order that specifies a quantity of a security, entered at a client station, for executing against any market participant that can satisfy a portion of the order; and
   matching the entered order by the server system against a trading interest in the market, with the trading interest comprising quotes and orders, and with a priority to match based on how the market participant participates in the market with a portion of the trading interest in the market being prioritized for a price level of the trading interest in the market according to:
      priority among displayed quotes/orders of market makers, electronic communication networks (ECNs) that do not charge a separate quote-access fee, and non-attributable agency orders of unlisted trading privilege (UTP) Exchanges, and
      when the trading interest of the displayed quotes/orders of market makers, ECNs that do not charge a separate quote-access fee, and non-attributable agency orders of UTP Exchanges is exhausted, matching based on a:
         priority among displayed quotes/orders of ECNs that charge a separate quote-access fee, with the quotes/orders of the ECNs that charge a separate quote-access fee being ranked by the amount of the quote-access fee charged.

2. The computer-implemented method of claim 1 wherein the displayed quotes/orders of the market makers, the ECNs that do not charge a separate quote-access fee, and the non-attributable agency orders of the UTP Exchanges are time prioritized if there is a tie in price priority.

3. The computer-implemented method of claim 1 wherein the displayed quotes/orders of the ECNs that charge a separate quote-access fee are time prioritized if there is a tie in the amount of the quote-access fee charged.

4. The computer-implemented method of claim 1 wherein one ECN that charges no quote-access fee is assigned a higher priority than another ECN that charges a quote-access fee.

5. The computer-implemented method of claim 1 wherein one ECN that charges a quote-access fee is assigned a higher priority than another ECN that charges a larger quote-access fee.

6. The computer-implemented method of claim 1 wherein each ECN that charges a separate quote-access fee enters, into the server system, a summary order that includes the quote-access fee associated with the ECN.

7. The computer-implemented method of claim 1 wherein the entered order is rounded up in price to the nearest cent and displayed to a user.

8. The computer-implemented method of claim 1 wherein the entered order is rounded down in price to the nearest cent and displayed to a user.

9. A computer-implemented method for trading securities in an electronic market, the method comprises:
   receiving by a server system an order that specifies a quantity of a security, entered at a client station, for executing against any market participant that can satisfy a portion of the order;
   aggregating for one or more electronic communication networks (ECNs) prices of orders with corresponding quote-access fees charged by the respective ECN to produce a price used for determining price priority; and matching the entered order by the server system against a trading interest in the market, with the trading interest comprising quotes and orders, and with a priority to match based on how the market participant participates in the market with a portion of the trading interest in the market being prioritized for a price level of the trading interest in the market according to:

priority among displayed quotes/orders of market makers, electronic communication networks (ECNs), and when the displayed quotes/orders of market makers, (ECNs) is exhausted, matching based on a:

priority among non-attributable agency orders of unlisted trading privilege (UTP) Exchanges.

10. The computer-implemented method of claim 9 wherein the interest in the market is subsequently further prioritized according to time priority of the displayed quotes/orders of the market makers, the ECNs, and the non-attributable agency orders of the UTP Exchanges if there is a tie in price priority.

11. The computer-implemented method of claim 9 wherein one ECN is assigned a higher priority than another ECN that has a larger aggregate price.

12. The computer-implemented method of claim 9 wherein each ECN enters into the server system a summary order that includes the quote-access fee, if any, associated with the ECN.

13. The computer-implemented method of claim 9 wherein the entered order is rounded up in price to the nearest cent and displayed to a user.

14. The computer-implemented method of claim 9 wherein the entered order is rounded down in price to the nearest cent and displayed to a user.

15. A computer program product tangibly embodied on a non-transitory computer readable medium, the computer program product comprises instructions for trading a security in an electronic market that causes a computer to:

receive by a server system an order that specifies a quantity of the security, entered at a client station, for executing against any market participant that can satisfy a portion of the order; and match the entered order by the server system against a trading interest in the market, with the trading interest comprising quotes and orders, with a priority to match based on how the market participant participates in the market with a portion of the trading interest in the market being prioritized for a price level of the trading interest in the market according to:

priority among displayed quotes/orders of market makers, electronic communication networks (ECNs) that do not charge a separate quote-access fee, and non-attributable agency orders of unlisted trading privilege (UTP) Exchanges, and when the trading interest of the displayed quotes/orders of market makers, ECNs that do not charge a separate quote-access fee, and non-attributable agency orders of UTP Exchanges is exhausted, matching based on a:

priority among displayed quotes/orders of ECNs that charge a separate quote-access fee, with the quotes/orders of the ECNs that charge a separate quote-access fee being ranked by the amount of the quote-access fee charged.

16. The computer program product of claim 15 wherein the displayed quotes/orders of the market makers, the ECNs that do not charge a separate quote-access fee, and the non-attributable agency orders of the UTP Exchanges are time prioritized if there is a tie in price priority.

17. The computer program product of claim 15 wherein the displayed quotes/orders of the ECNs that charge a separate quote-access fee are time prioritized if there is a tie in the amount of the quote-access fee charged.

18. The computer program product of claim 15 wherein one ECN that charges no quote-access fee is assigned a higher priority than another ECN that charges a quote-access fee.

19. The computer program product of claim 15 wherein one ECN that charges a quote-access fee is assigned a higher priority than another ECN that charges a larger quote-access fee.

20. The computer program product of claim 15 wherein each ECN that charges a separate quote-access fee enters, into the server system, a summary order that includes the quote-access fee associated with the ECN.

21. The computer program product of claim 15 wherein the entered order is rounded up in price to the nearest cent and displayed to a user.

22. The computer program product of claim 15 wherein the entered order is rounded down in price to the nearest cent and displayed to a user.

23. A computer program product tangibly embodied on a non-transitory computer readable medium, the computer program product comprises instructions for trading a security in an electronic market that causes a computer to:

receive by a server system an order that specifies a quantity of the security, entered at a client station, for executing against any market participant that can satisfy a portion of the order;

aggregate, for one or more electronic communication networks (ECNs), prices of orders with corresponding quote-access fees charged by the respective ECN to produce a price used for determining price priority; and match the entered order by the server system against a trading interest in the market, with the trading interest comprising quotes and orders, and with a priority to match based on how the market participant participates in the market with a portion of the trading interest in the market being prioritized for a price level of the trading interest in the market according to:

priority among displayed quotes/orders of market makers, electronic communication networks (ECNs); and when the displayed quotes/orders of market makers, (ECNs) is exhausted, matching based on a:

priority among non-attributable agency orders of unlisted trading privilege (UTP) Exchanges.

24. The computer program product of claim 23 wherein the interest in the market is subsequently further prioritized according to time priority of the displayed quotes/orders of the market makers, the ECNs, and the non-attributable agency orders of the UTP Exchanges if there is a tie in price priority.

25. The computer program product of claim 23 wherein one ECN is assigned a higher priority than another ECN that has a larger aggregate price.

26. The computer program product of claim 23 wherein each ECN enters into the server system a summary order that includes the quote-access fee, if any, associated with the ECN.

27. The computer program product of claim 23 wherein the entered order is rounded up in price to the nearest cent and displayed to a user.

28. The computer program product of claim 23 wherein the entered order is rounded down in price to the nearest cent and displayed to a user.

29. A system comprises:
one or more computers, each comprising:
   a processor;
   memory coupled to the processor, the processor configured to:
      receive an order that specifies a quantity of the security, entered at a client station, for executing against any market participant that can satisfy a portion of the order; and
      match the entered order against a trading interest in the market, with the trading interest comprising quotes and orders, with a priority to match based on how the market participant participates in the market with a portion of the trading interest in the market being prioritized for a price level of the trading interest in the market according to:
         priority among displayed quotes/orders of market makers, electronic communication networks (ECNs) that do not charge a separate quote-access fee, and non-attributable agency orders of unlisted trading privilege (UTP) Exchanges, and
         when the trading interest of the displayed quotes/orders of market makers, ECNs that do not charge a separate quote-access fee, and non-attributable agency orders of UTP Exchanges is exhausted, matching based on a:
            priority among displayed quotes/orders of ECNs that charge a separate quote-access fee, with the quotes/orders of the ECNs that charge a separate quote-access fee being ranked by the amount of the quote-access fee charged.

30. The system of claim 29 wherein the displayed quotes/orders of the market makers, the ECNs that do not charge a separate quote-access fee, and the non-attributable agency orders of the UTP Exchanges are time prioritized if there is a tie in price priority.

31. The system of claim 29 wherein the displayed quotes/orders of the ECNs that charge a separate quote-access fee are time prioritized if there is a tie in the amount of the quote-access fee charged.

32. The system of claim 29 wherein one ECN that charges no quote-access fee is assigned a higher priority than another ECN that charges a quote-access fee.

33. The system of claim 29 wherein one ECN that charges a quote-access fee is assigned a higher priority than another ECN that charges a larger quote-access fee.

34. The system of claim 29 wherein each ECN that charges a separate quote-access fee enters, into the server system, a summary order that includes the quote-access fee associated with the ECN.

35. The system of claim 29 wherein the entered order is rounded up in price to the nearest cent and displayed to a user.

36. The system of claim 29 wherein the entered order is rounded down in price to the nearest cent and displayed to a user.

37. A system comprises:
one or more computers, each comprising:
   a processor;
   memory coupled to the processor, the processor configured to:
      receive an order that specifies a quantity of the security, entered at a client station, for executing against any market participant that can satisfy a portion of the order;
      aggregate, for one or more electronic communication networks (ECNs), prices of orders with corresponding quote-access fees charged by the respective ECN to produce a price used for determining price priority; and
      match the entered order against a trading interest in the market, with the trading interest comprising quotes and orders, and with a priority to match based on how the market participant participates in the market with a portion of the trading interest in the market being prioritized for a price level of the trading interest in the market according to:
         priority among displayed quotes/orders of market makers, electronic communication networks (ECNs), and
         when the displayed quotes/orders of market makers, (ECNs) is exhausted, matching based on a:
            priority among non-attributable agency orders of unlisted trading privilege (UTP) Exchanges.

38. The system of claim 37 wherein the interest in the market is subsequently further prioritized according to time priority of the displayed quotes/orders of the market makers, the ECNs, and the non-attributable agency orders of the UTP Exchanges if there is a tie in price priority.

39. The system of claim 37 wherein one ECN is assigned a higher priority than another ECN that has a larger aggregate price.

40. The system of claim 37 wherein each ECN enters into the server system a summary entered order that includes the quote-access fee, if any, associated with the ECN.

41. The system of claim 37 wherein the entered order is rounded up in price to the nearest cent and displayed to a user.

42. The system of claim 37 wherein the entered order is rounded down in price to the nearest cent and displayed to a user.

* * * * *